(12) United States Patent
Urbanik et al.

(10) Patent No.: US 7,664,765 B2
(45) Date of Patent: Feb. 16, 2010

(54) METHOD FOR ACCELERATING THE COMPUTATIONAL SPEED OF A COMPUTER ALGORITHM

(75) Inventors: Jerzy Henryk Urbanik, Astoria, NY (US); Krzysztof Ryszard Kalita, Cracow (PL); Przemyslaw Bartlomiej Bezeg, Bochnia (PL)

(73) Assignee: Cipherflux, LLC, Wilmington, DE (US)

( * ) Notice: Subject to any disclaimer, the term of this patent is extended or adjusted under 35 U.S.C. 154(b) by 686 days.

(21) Appl. No.: 11/485,188

(22) Filed: Jul. 12, 2006

(65) Prior Publication Data
US 2007/0030975 A1 Feb. 8, 2007

Related U.S. Application Data

(60) Provisional application No. 60/698,877, filed on Jul. 12, 2005.

(51) Int. Cl.
*G06F 17/30* (2006.01)

(52) U.S. Cl. .................. 707/101; 707/102; 712/208; 712/209; 712/210; 712/213; 712/216

(58) Field of Classification Search .......... 707/100, 707/101, 102; 712/244, 238, 216, 215, 213, 712/210, 209, 208
See application file for complete search history.

(56) References Cited

U.S. PATENT DOCUMENTS

| | | | | | |
|---|---|---|---|---|---|
| 5,197,135 | A | * | 3/1993 | Eickemeyer et al. | 712/217 |
| 5,301,341 | A | * | 4/1994 | Vassiliadis et al. | 712/215 |
| 5,303,356 | A | * | 4/1994 | Vassiliadis et al. | 712/238 |
| 5,354,460 | A | * | 10/1994 | Kearney et al. | 210/198.2 |
| 5,448,746 | A | * | 9/1995 | Eickemeyer et al. | 712/210 |
| 5,459,844 | A | * | 10/1995 | Eickemeyer et al. | 712/213 |
| 5,504,932 | A | * | 4/1996 | Vassiliadis et al. | 712/208 |
| 6,453,412 | B1 | * | 9/2002 | Henry et al. | 712/244 |
| 6,754,662 | B1 | | 6/2004 | Li | |
| 2002/0129012 | A1 | | 9/2002 | Green | |
| 2004/0015610 | A1 | | 1/2004 | Treadwell | |

* cited by examiner

*Primary Examiner*—Jean M Corrielus
(74) *Attorney, Agent, or Firm*—Kramer Levin Naftalis & Frankel LLP

(57) ABSTRACT

A new technique for accelerating the computational speed of a computer algorithm is provided. The inventive technique can be applied to an encryption algorithm, such as an RSA algorithm, for example. A method and system for effecting secure information communications utilizing an accelerated information encryption algorithm is also contemplated.

9 Claims, 42 Drawing Sheets a1) $n = <0, +\infty), n \in N^*$ a2) $\left.\begin{array}{l} i = <0, n-1> \\ j = <1, n-1> \end{array}\right\} i,j \in N$ a3) $i = j - 1$ a4) $p, k = (-\infty, +\infty), p, k \in Z \wedge p, k \notin R \cdot Z$ a5)

a6) ENCRYPTING OF NUMBER $p_i$ AND RECEIVING $k_i$ a7) ENCRYPTING OF NUMBER $p_n$ AND RECEIVING $k_n$ a8)

RSA
ENCRYPTING WITH/WITHOUT THE USE OF MATHEMATICAL LIBRARY.
VALUES PRESENTED IN SI STANDARD, (1 KB = 1000 B)

| LENGTH OF THE KEY IN BITS | STANDARD ENCRYPTION (WITHOUT MATHEMATICAL LIBRARY) | ACCELERATED ENCRYPTION (WITHOUT MATHEMATICAL LIBRARY) | STANDARD ENCRYPTION (WITH MATHEMATICAL LIBRARY) | ACCELERATED ENCRYPTION (WITH MATHEMATICAL LIBRARY) | STANDARD DECRYPTION (WITHOUT MATHEMATICAL LIBRARY) | ACCELERATED DECRYPTION (WITHOUT MATHEMATICAL LIBRARY) | STANDARD DECRYPTION (WITH MATHEMATICAL LIBRARY) | ACCELERATED DECRYPTION (WITH MATHEMATICAL LIBRARY) |
|---|---|---|---|---|---|---|---|---|
| 31 | 45 KB/s | 19 GB/s | 16 KB/s | 1 GB/s | 46 KB/s | 30 MB/s | 16 KB/s | 19 MB/s |
| 62 | - | - | 7 KB/s | 1 GB/s | - | - | 7 KB/s | 19 MB/s |
| 64 | - | - | 7 KB/s | 1 GB/s | - | - | 7 KB/s | 18 MB/s |
| 128 | - | - | 3 KB/s | 1 GB/s | - | - | 3 KB/s | 18 MB/s |
| 256 | - | - | 1.5 KB/s | 1 GB/s | - | - | 1.5 KB/s | 16 MB/s |
| 510 | - | - | 700 B/s | 1 GB/s | - | - | 700 KB/s | 14 MB/s |
| 1024 | - | - | 350 B/s | 1 GB/s | - | - | 350 B/s | 12 MB/s |
| 2048 | - | - | 124 B/s | 1 GB/s | - | - | 124 B/s | 9 MB/s |
| 4096 | - | - | 45 B/s | 1 GB/s | - | - | 45 B/s | 6 MB/s |
| 8187 | - | - | 14 B/s | 1 GB/s | - | - | 14 B/s | 4 MB/s |
| 16392 | - | - | 4 B/s | 1 GB/s | - | - | 4 B/s | 2 MB/s |
| 32764 | - | - | 1 B/s | 1 GB/s | - | - | 1 B/s | 1 MB/s |

FIG. 6a

VALUES PRESENTED IN SI STANDARD (1 KB = 1000 B)

| ALGORITHM | LENGTH OF THE KEY IN BITS | STANDARD ENCRYPTION | ACCELERATED ENCRYPTION | STANDARD DECRYPTION | ACCELERATED DECRYPTION |
|---|---|---|---|---|---|
| AES | 128 | 9 MB/s | 19 GB/s | 9 MB/s | 25 MB/s |
| AES | 256 | 2 MB/s | 19 GB/s | 2 MB/s | 31 MB/s |
| BLOWFISH | 256 | 8.1 MB/s | 18 GB/s | 8.3 MB/s | 31 MB/s |
| CAST128 | 128 | 6.8 MB/s | 18 GB/s | 7 MB/s | 31 MB/s |
| CAST256 | 256 | 2.4 MB/s | 18 GB/s | 2.3 MB/s | 31 MB/s |
| DES | 64 | 3.3 MB/s | 18 GB/s | 3.3 MB/s | 31 MB/s |
| 3DES | 192 | 1.5 MB/s | 19 GB/s | 1.4 MB/s | 31 MB/s |
| ICE | 64 | 3.8 MB/s | 18 GB/s | 3.9 MB/s | 31 MB/s |
| ICE2 | 128 | 2.1 MB/s | 18 GB/s | 2.2 MB/s | 31 MB/s |
| IDEA | 128 | 1.6 MB/s | 18 GB/s | 1.6 MB/s | 31 MB/s |
| MARS | 256 | 1.6 MB/s | 18 GB/s | 1.6 MB/s | 31 MB/s |
| MISTY1 | 128 | 2.7 MB/s | 18 GB/s | 2.7 MB/s | 31 MB/s |
| RC2 | 256 | 1.7 MB/s | 18 GB/s | 1.7 MB/s | 31 MB/s |
| RC5 | 256 | 6.2 MB/s | 18 GB/s | 6.4 MB/s | 31 MB/s |
| RC6 | 256 | 2.2 MB/s | 18 GB/s | 2.2 MB/s | 31 MB/s |
| SERPENT | 256 | 0.8 MB/s | 18 GB/s | 0.8 MB/s | 31 MB/s |
| TEA | 128 | 4.7 MB/s | 18 GB/s | 4.9 MB/s | 31 MB/s |
| THIN ICE | 64 | 6.2 MB/s | 18 GB/s | 6.6 MB/s | 31 MB/s |
| TWOFISH | 256 | 4.1 MB/s | 18 GB/s | 4.2 MB/s | 31 MB/s |

FIG. 6b

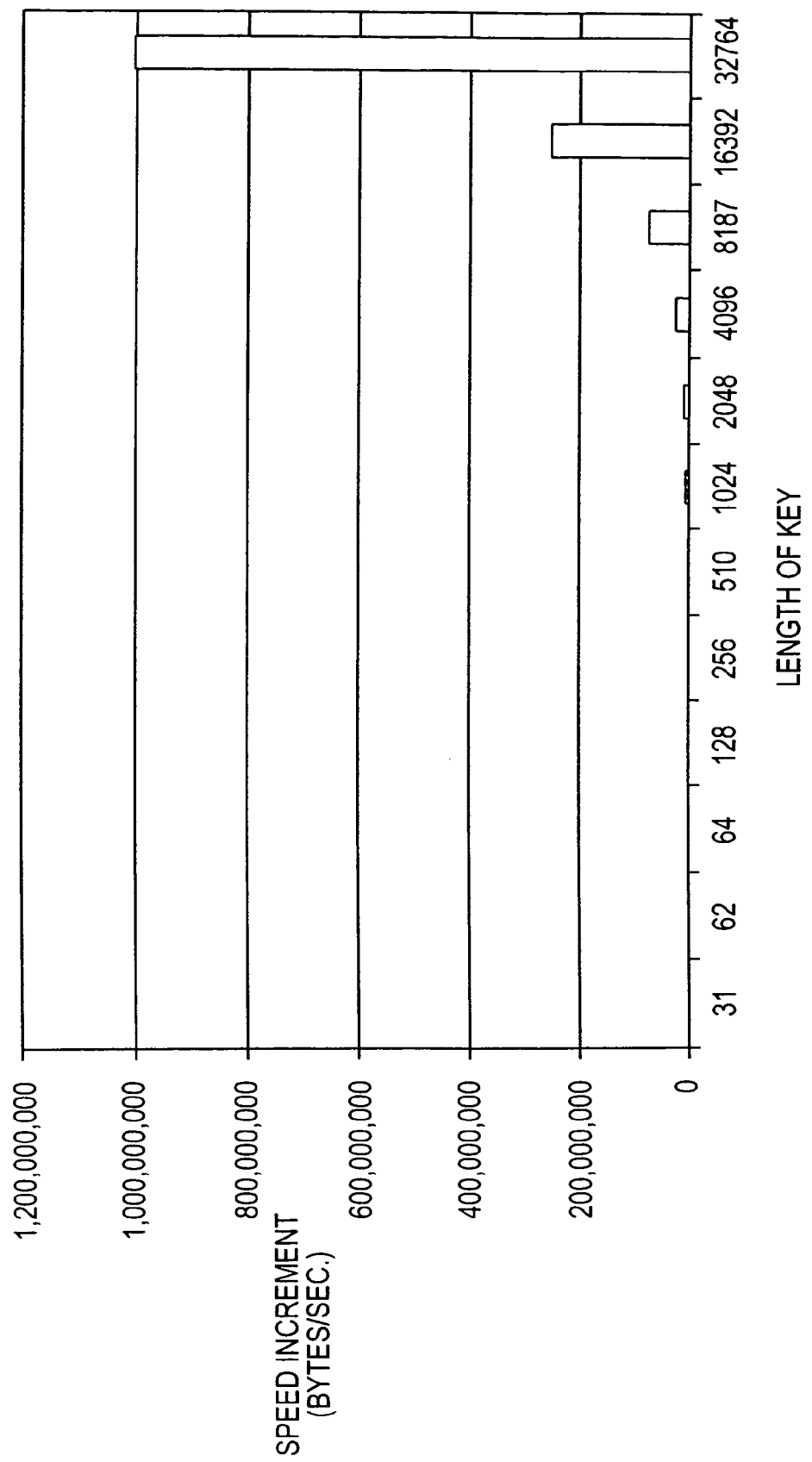

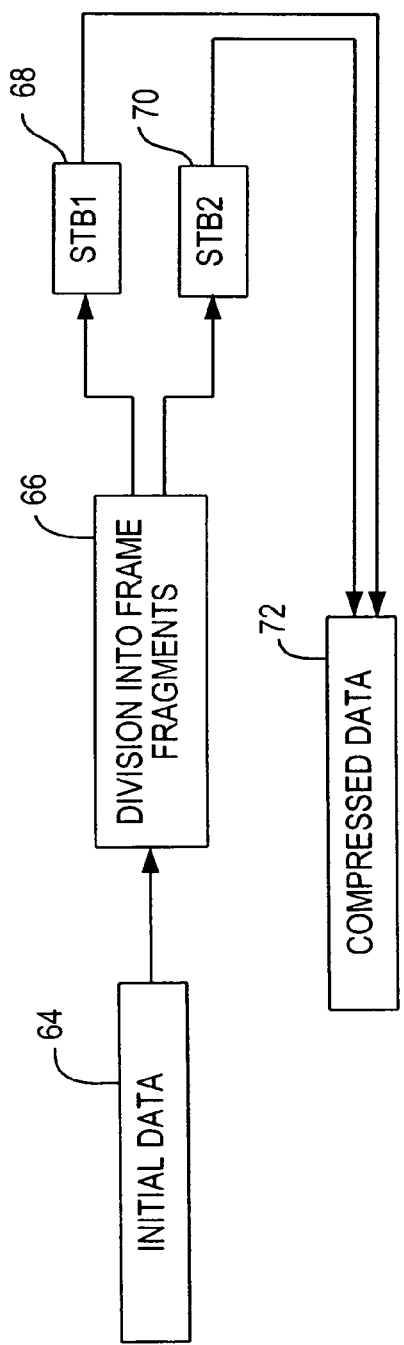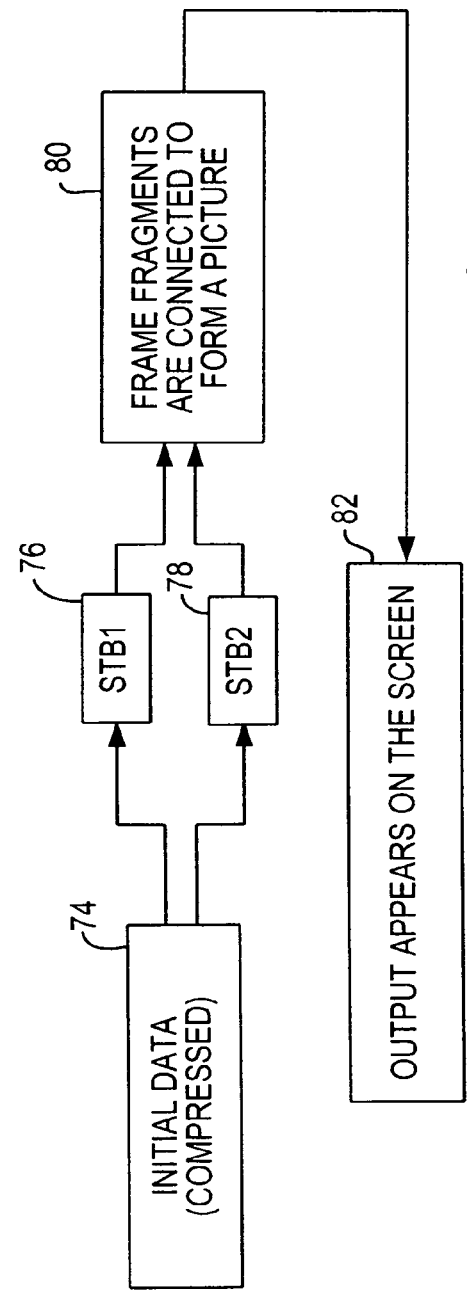

| X1Y1 | X1aY1 | | X2Y1 | X2aY1 | | X3Y1 | X3aY1 | | X4Y1 | X4aY1 | | |
|---|---|---|---|---|---|---|---|---|---|---|---|---|
| X1Y2 | X1aY2 | | X2Y2 | X2aY2 | | X3Y2 | X3aY2 | | X4Y2 | X4aY2 | | |
| X1Y3 | X1aY3 | | X2Y3 | X2aY3 | | X3Y3 | X3aY3 | | X4Y3 | X4aY3 | | |
| X1Y4 | X1aY4 | | X2Y4 | X2aY4 | | X3Y4 | X3aY4 | | X4Y4 | X4aY4 | | |

| X1Y1 | X1aY1 | X1bY1 | X2Y1 | X2aY1 | X2bY1 | X3Y1 | X3aY1 | X3bY1 | X4Y1 | X4aY1 | X4bY1 |   |   |   |
|------|-------|-------|------|-------|-------|------|-------|-------|------|-------|-------|---|---|---|
|      |       |       |      |       |       |      |       |       |      |       |       |   |   |   |
| X1Y2 | X1aY2 | X1bY2 | X2Y2 | X2aY2 | X2bY2 | X3Y2 | X3aY2 | X3bY2 | X4Y2 | X4aY2 | X4bY2 |   |   |   |
|      |       |       |      |       |       |      |       |       |      |       |       |   |   |   |
| X1Y3 | X1aY3 | X1bY3 | X2Y3 | X2aY3 | X2bY3 | X3Y3 | X3aY3 | X3bY3 | X4Y3 | X4aY3 | X4bY3 |   |   |   |
|      |       |       |      |       |       |      |       |       |      |       |       |   |   |   |
| X1Y4 | X1aY4 | X1bY4 | X2Y4 | X2aY4 | X2bY4 | X3Y4 | X3aY4 | X3bY4 | X4Y4 | X4aY4 | X4bY4 |   |   |   |
|      |       |       |      |       |       |      |       |       |      |       |       |   |   |   |

| X1Y1 | X1aY1 | X1bY1 | X1cY1 | X2Y1 | X2aY1 | X2bY1 | X2cY1 | X3Y1 | X3aY1 | X3bY1 | X3cY1 | X4Y1 | X4aY1 | X4bY1 | X4cY1 | | |
|---|---|---|---|---|---|---|---|---|---|---|---|---|---|---|---|---|---|
| | | | | | | | | | | | | | | | | | |
| X1Y2 | X1aY2 | X1bY2 | X1cY2 | X2Y2 | X2aY2 | X2bY2 | X2cY2 | X3Y2 | X3aY2 | X3bY2 | X3cY2 | X4Y2 | X4aY2 | X4bY2 | X4cY2 | | |
| | | | | | | | | | | | | | | | | | |
| X1Y3 | X1aY3 | X1bY3 | X1cY3 | X2Y3 | X2aY3 | X2bY3 | X2cY3 | X3Y3 | X3aY3 | X3bY3 | X3cY3 | X4Y3 | X4aY3 | X4bY3 | X4cY3 | | |
| | | | | | | | | | | | | | | | | | |
| X1Y4 | X1aY4 | X1bY4 | X1cY4 | X2Y4 | X2aY4 | X2bY4 | X2cY4 | X3Y4 | X3aY4 | X3bY4 | X3cY4 | X4Y4 | X4aY4 | X4bY4 | X4cY4 | | |
| | | | | | | | | | | | | | | | | | |

| X1Y1 | X1aY1 | X1bY1 | X1cY1 | X2Y1 | X2aY1 | X2bY1 | X2cY1 | X3Y1 | X3aY1 | X3bY1 | X3cY1 | X4Y1 | X4aY1 | X4bY1 | X4cY1 |
|---|---|---|---|---|---|---|---|---|---|---|---|---|---|---|---|
| X1Y1a | | | | X2Y1a | | | | X3Y1a | | | | X4Y1a | | | |
| X1Y2 | X1aY2 | X1bY2 | X1cY2 | X2Y2 | X2aY2 | X2bY2 | X2cY2 | X3Y2 | X3aY2 | X3bY2 | X3cY2 | X4Y2 | X4aY2 | X4bY2 | X4cY2 |
| X1Y2a | | | | X2Y2a | | | | X3Y2a | | | | X4Y2a | | | |
| X1Y3 | X1aY3 | X1bY3 | X1cY3 | X2Y3 | X2aY3 | X2bY3 | X2cY3 | X3Y3 | X3aY3 | X3bY3 | X3cY3 | X4Y3 | X4aY3 | X4bY3 | X4cY3 |
| X1Y3a | | | | X2Y3a | | | | X3Y3a | | | | X4Y3a | | | |
| X1Y4 | X1aY4 | X1bY4 | X1cY4 | X2Y4 | X2aY4 | X2bY4 | X2cY4 | X3Y4 | X3aY4 | X3bY4 | X3cY4 | X4Y4 | X4aY4 | X4bY4 | X4cY4 |
| X1Y4a | | | | X2Y4a | | | | X3Y4a | | | | X4Y4a | | | |

| X1Y1 | X1aY1 | X1bY1 | X1cY1 | X2Y1 | X2aY1 | X2bY1 | X2cY1 | X3Y1 | X3aY1 | X3bY1 | X3cY1 | X4Y1 | X4aY1 | X4bY1 | X4cY1 |
|---|---|---|---|---|---|---|---|---|---|---|---|---|---|---|---|
| X1Y1a | X1aY1a |  |  |  | X2aY1a |  |  |  | X3aY1a |  |  |  | X4aY1a |  |  |
| X1Y2 | X1aY2 | X1bY2 | X1cY2 | X2Y2 | X2aY2 | X2bY2 | X2cY2 | X3Y2 | X3aY2 | X3bY2 | X3cY2 | X4Y2 | X4aY2 | X4bY2 | X4cY2 |
| X1Y2a | X1aY2a |  |  | X2Y2a | X2aY2a |  |  | X3Y2a | X3aY2a |  |  | X4Y2a | X4aY2a |  |  |
| X1Y3 | X1aY3 | X1bY3 | X1cY3 | X2Y3 | X2aY3 | X2bY3 | X2cY3 | X3Y3 | X3aY3 | X3bY3 | X3cY3 | X4Y3 | X4aY3 | X4bY3 | X4cY3 |
| X1Y3a | X1aY3a |  |  | X2Y3a | X2aY3a |  |  | X3Y3a | X3aY3a |  |  |  | X4aY3a |  |  |
| X1Y4 | X1aY4 | X1bY4 | X1cY4 | X2Y4 | X2aY4 | X2bY4 | X2cY4 | X3Y4 | X3aY4 | X3bY4 | X3cY4 | X4Y4 | X4aY4 | X4bY4 | X4cY4 |
| X1Y4a | X1aY4a |  |  | X2Y4a | X2aY4a |  |  | X3Y4a | X3aY4a |  |  | X4Y4a | X4aY4a |  |  |

FIG. 10c 6

| | X1 | X1a | X1b | X1c | X2 | X2a | X2b | X2c | X3 | X3a | X3b | X3c | X4 | X4a | X4b | X4c |
|---|---|---|---|---|---|---|---|---|---|---|---|---|---|---|---|---|
| Y1 | X1Y1 | X1aY1 | X1bY1 | X1cY1 | X2Y1 | X2aY1 | X2bY1 | X2cY1 | X3Y1 | X3aY1 | X3bY1 | X3cY1 | X4Y1 | X4aY1 | X4bY1 | X4cY1 |
| Y1a | X1Y1a | | X1bY1a | | X2Y1a | X2aY1a | X2bY1a | | X3Y1a | X3aY1a | | | X4Y1a | X4aY1a | X4bY1a | |
| Y2 | X1Y2 | X1aY2 | X1bY2 | X1cY2 | X2Y2 | X2aY2 | X2bY2 | X2cY2 | X3Y2 | X3aY2 | X3bY2 | X3cY2 | X4Y2 | X4aY2 | X4bY2 | X4cY2 |
| Y2a | X1Y2a | X1aY2a | X1bY2a | | X2Y2a | X2aY2a | X2bY2a | | X3Y2a | X3aY2a | X3bY2a | | X4Y2a | X4aY2a | X4bY2a | |
| Y3 | X1Y3 | X1aY3 | X1bY3 | X1cY3 | X2Y3 | X2aY3 | X2bY3 | X2cY3 | X3Y3 | X3aY3 | X3bY3 | X3cY3 | X4Y3 | X4aY3 | X4bY3 | X4cY3 |
| Y3a | X1Y3a | X1aY3a | X1bY3a | | X2Y3a | X2aY3a | X2bY3a | | X3Y3a | X3aY3a | X3bY3a | | X4Y3a | X4aY3a | X4bY3a | |
| Y4 | X1Y4 | X1aY4 | X1bY4 | X1cY4 | X2Y4 | X2aY4 | X2bY4 | X2cY4 | X3Y4 | X3aY4 | X3bY4 | X3cY4 | X4Y4 | X4aY4 | X4bY4 | X4cY4 |
| Y4a | X1Y4a | X1aY4a | X1bY4a | | X2Y4a | X2aY4a | X2bY4a$^a$ | | X3Y4a | X3aY4a | X3bY4a | | X4Y4a | X4aY4a | X4bY4a | |
| | | | | | | | | | | | | | | | | |
| | | | | | | | | | | | | | | | | |

FIG. 10c 7

| | X1 | X1a | X1b | X1c | X2 | X2a | X2b | X2c | X3 | X3a | X3b | X3c | X4 | X4a | X4b | X4c |
|---|---|---|---|---|---|---|---|---|---|---|---|---|---|---|---|---|
| Y1 | X1Y1 | X1aY1 | X1bY1 | X1cY1 | X2Y1 | X2aY1 | X2bY1 | X2cY1 | X3Y1 | X3aY1 | X3bY1 | X3cY1 | X4Y1 | X4aY1 | X4bY1 | X4cY1 |
| Y1a | X1Y1a | X1aY1a | X1bY1a | X1cY1a | X2Y1a | X2aY1a | X2bY1a | X2cY1a | X3Y1a | X3aY1a | X3bY1a | X3cY1a | X4Y1a | X4aY1a | X4bY1a | X4cY1a |
| | | | | | | | | | | | | | | | | |
| Y2 | X1Y2 | X1aY2 | X1bY2 | X1cY2 | X2Y2 | X2aY2 | X2bY2 | X2cY2 | X3Y2 | X3aY2 | X3bY2 | X3cY2 | X4Y2 | X4aY2 | X4bY2 | X4cY2 |
| Y2a | X1Y2a | X1aY2a | X1bY2a | X1cY2a | X2Y2a | X2aY2a | X2bY2a | X2cY2a | X3Y2a | X3aY2a | X3bY2a | X3cY2a | X4Y2a | X4aY2a | X4bY2a | X4cY2a |
| | | | | | | | | | | | | | | | | |
| Y3 | X1Y3 | X1aY3 | X1bY3 | X1cY3 | X2Y3 | X2aY3 | X2bY3 | X2cY3 | X3Y3 | X3aY3 | X3bY3 | X3cY3 | X4Y3 | X4aY3 | X4bY3 | X4cY3 |
| Y3a | X1Y3a | X1aY3a | X1bY3a | X1cY3a | X2Y3a | X2aY3a | X2bY3a | X2cY3a | X3Y3a | X3aY3a | X3bY3a | X3cY3a | X4Y3a | X4aY3a | X4bY3a | X4cY3a |
| | | | | | | | | | | | | | | | | |
| Y4 | X1Y4 | X1aY4 | X1bY4 | X1cY4 | X2Y4 | X2aY4 | X2bY4 | X2cY4 | X3Y4 | X3aY4 | X3bY4 | X3cY4 | X4Y4 | X4aY4 | X4bY4 | X4cY4 |
| Y4a | X1Y4a | X1aY4a | X1bY4a | X1cY4a | X2Y4a | X2aY4a | X2bY4a | X2cY4a | X3Y4a | X3aY4a | X3bY4a | X3cY4a | X4Y4a | X4aY4a | X4bY4a | X4cY4a |
| | | | | | | | | | | | | | | | | |

*FIG. 10c 8*

| X1Y1 | X1aY1 | X1bY1 | X1cY1 | X2Y1 | X2aY1 | X2bY1 | X2cY1 | X3Y1 | X3aY1 | X3bY1 | X3cY1 | X4Y1 | X4aY1 | X4bY1 | X4cY1 |
|---|---|---|---|---|---|---|---|---|---|---|---|---|---|---|---|
| X1Y1a | X1aY1a | X1bY1a | X1cY1a | X2Y1a | X2aY1a | X2bY1a | X2cY1a | X3Y1a | X3aY1a | X3bY1a | X3cY1a | X4Y1a | X4aY1a | X4bY1a | X4cY1a |
| X1Y1b |  |  |  | X2Y1b |  |  |  | X3Y1b |  |  |  | X4Y1b |  |  |  |
|  |  |  |  |  |  |  |  |  |  |  |  |  |  |  |  |
| X1Y2 | X1aY2 | X1bY2 | X1cY2 | X2Y2 | X2aY2 | X2bY2 | X2cY2 | X3Y2 | X3aY2 | X3bY2 | X3cY2 | X4Y2 | X4aY2 | X4bY2 | X4cY2 |
| X1Y2a | X1aY2a | X1bY2a | X1cY2a | X2Y2a | X2aY2a | X2bY2a | X2cY2a | X3Y2a | X3aY2a | X3bY2a | X3cY2a | X4Y2a | X4aY2a | X4bY2a | X4cY2a |
| X1Y2b |  |  |  | X2Y2b |  |  |  | X3Y2b |  |  |  | X4Y2b |  |  |  |
|  |  |  |  |  |  |  |  |  |  |  |  |  |  |  |  |
| X1Y3 | X1aY3 | X1bY3 | X1cY3 | X2Y3 | X2aY3 | X2bY3 | X2cY3 | X3Y3 | X3aY3 | X3bY3 | X3cY3 | X4Y3 | X4aY3 | X4bY3 | X4cY3 |
| X1Y3a | X1aY3a | X1bY3a | X1cY3a | X2Y3a | X2aY3a | X2bY3a | X2cY3a | X3Y3a | X3aY3a | X3bY3a | X3cY3a | X4Y3a | X4aY3a | X4bY3a | X4cY3a |
| X1Y3b |  |  |  | X2Y3b |  |  |  | X3Y3b |  |  |  | X4Y3b |  |  |  |
|  |  |  |  |  |  |  |  |  |  |  |  |  |  |  |  |
| X1Y4 | X1aY4 | X1bY4 | X1cY4 | X2Y4 | X2aY4 | X2bY4 | X2cY4 | X3Y4 | X3aY4 | X3bY4 | X3cY4 | X4Y4 | X4aY4 | X4bY4 | X4cY4 |
| X1Y4a | X1aY4a | X1bY4a | X1cY4a | X2Y4a | X2aY4a | X2bY4a | X2cY4a | X3Y4a | X3aY4a | X3bY4a | X3cY4a | X4Y4a | X4aY4a | X4bY4a | X4cY4a |
| X1Y4b |  |  |  | X2Y4b |  |  |  | X3Y4b |  |  |  | X4Y4b |  |  |  |
|  |  |  |  |  |  |  |  |  |  |  |  |  |  |  |  |

FIG. 10c 9

| X1Y1 | X1bY1 | X1cY1 | X2Y1 | X2aY1 | X2bY1 | X2cY1 | X3Y1 | X3aY1 | X3bY1 | X3cY1 | X4Y1 | X4aY1 | X4bY1 | X4cY1 |
|---|---|---|---|---|---|---|---|---|---|---|---|---|---|---|
| X1Y1a | X1bY1a | X1cY1a | X2Y1a | X2aY1a | X2bY1a | X2cY1a | X3Y1a | X3aY1a | X3bY1a | X3cY1a | X4Y1a | X4aY1a | X4bY1a | X4cY1a |
| X1Y1b |  |  | X2Y1b | X2aY1b |  |  | X3Y1b | X3aY1b |  |  | X4Y1b | X4aY1b |  |  |
| X1Y2 | X1bY2 | X1cY2 | X2Y2 | X2aY2 | X2bY2 | X2cY2 | X3Y2 | X3aY2 | X3bY2 | X3cY2 | X4Y2 | X4aY2 | X4bY2 | X4cY2 |
| X1Y2a | X1bY2a | X1cY2a | X2Y2a | X2aY2a | X2bY2a | X2cY2a | X3Y2a | X3aY2a | X3bY2a | X3cY2a | X4Y2a | X4aY2a | X4bY2a | X4cY2a |
| X1Y2b |  |  | X2Y2b | X2aY2b |  |  | X3Y2b | X3aY2b |  |  | X4Y2b | X4aY2b |  |  |
| X1Y3 | X1bY3 | X1cY3 | X2Y3 | X2aY3 | X2bY3 | X2cY3 | X3Y3 | X3aY3 | X3bY3 | X3cY3 | X4Y3 | X4aY3 | X4bY3 | X4cY3 |
| X1Y3a | X1bY3a | X1cY3a | X2Y3a | X2aY3a | X2bY3a | X2cY3a | X3Y3a | X3aY3a | X3bY3a | X3cY3a | X4Y3a | X4aY3a | X4bY3a | X4cY3a |
| X1Y3b |  |  | X2Y3b | X2aY3b |  |  | X3Y3b | X3aY3b |  |  | X4Y3b | X4aY3b |  |  |
| X1Y4 | X1bY4 | X1cY4 | X2Y4 | X2aY4 | X2bY4 | X2cY4 | X3Y4 | X3aY4 | X3bY4 | X3cY4 | X4Y4 | X4aY4 | X4bY4 | X4cY4 |
| X1Y4a | X1bY4a | X1cY4a | X2Y4a | X2aY4a | X2bY4a | X2cY4a | X3Y4a | X3aY4a | X3bY4a | X3cY4a | X4Y4a | X4aY4a | X4bY4a | X4cY4a |
| X1Y4b |  |  | X2Y4b | X2aY4b |  |  | X3Y4b | X3aY4b |  |  | X4Y4b | X4aY4b |  |  |

FIG. 10c 10

| X1Y1 | X1aY1 | X1bY1 | X1cY1 | X2Y1 | X2aY1 | X2bY1 | X2cY1 | X3Y1 | X3aY1 | X3bY1 | X3cY1 | X4Y1 | X4aY1 | X4bY1 | X4cY1 |
|---|---|---|---|---|---|---|---|---|---|---|---|---|---|---|---|
| X1Y1a | X1aY1a | X1bY1a | X1cY1a | X2Y1a | X2aY1a | X2bY1a | X2cY1a | X3Y1a | X3aY1a | X3bY1a | X3cY1a | X4Y1a | X4aY1a | X4bY1a | X4cY1a |
| X1Y1b | X1aY1b | X1bY1b |  | X2Y1b | X2aY1b | X2bY1b |  | X3Y1b | X3aY1b | X3bY1b |  | X4Y1b | X4aY1b | X4bY1b |  |
| X1Y2 | X1aY2 | X1bY2 | X1cY2 | X2Y2 | X2aY2 | X2bY2 | X2cY2 | X3Y2 | X3aY2 | X3bY2 | X3cY2 | X4Y2 | X4aY2 | X4bY2 | X4cY2 |
| X1Y2a | X1aY2a | X1bY2a | X1cY2a | X2Y2a | X2aY2a | X2bY2a | X2cY2a | X3Y2a | X3aY2a | X3bY2a | X3cY2a | X4Y2a | X4aY2a | X4bY2a | X4cY2a |
| X1Y2b | X1aY2b | X1bY2b |  | X2Y2b | X2aY2b | X2bY2b |  | X3Y2b | X3aY2b | X3bY2b |  | X4Y2b | X4aY2b | X4bY2b |  |
| X1Y3 | X1aY3 | X1bY3 | X1cY3 | X2Y3 | X2aY3 | X2bY3 | X2cY3 | X3Y3 | X3aY3 | X3bY3 | X3cY3 | X4Y3 | X4aY3 | X4bY3 | X4cY3 |
| X1Y3a | X1aY3a | X1bY3a | X1cY3a | X2Y3a | X2aY3a | X2bY3a | X2cY3a | X3Y3a | X3aY3a | X3bY3a | X3cY3a | X4Y3a | X4aY3a | X4bY3a | X4cY3a |
| X1Y3b | X1aY3b | X1bY3b |  | X2Y3b | X2aY3b | X2bY3b |  | X3Y3b | X3aY3b | X3bY3b |  | X4Y3b | X4aY3b | X4bY3b |  |
| X1Y4 | X1aY4 | X1bY4 | X1cY4 | X2Y4 | X2aY4 | X2bY4 | X2cY4 | X3Y4 | X3aY4 | X3bY4 | X3cY4 | X4Y4 | X4aY4 | X4bY4 | X4cY4 |
| X1Y4a | X1aY4a | X1bY4a | X1cY4a | X2Y4a | X2aY4a | X2bY4a | X2cY4a | X3Y4a | X3aY4a | X3bY4a | X3cY4a | X4Y4a | X4aY4a | X4bY4a | X4cY4a |
| X1Y4b | X1aY4b | X1bY4b | X1cY4b | X2Y4b | X2aY4b | X2bY4b |  | X3Y4b | X3aY4b | X3bY4b |  | X4Y4b | X4aY4b | X4bY4b |  |

FIG. 10c 11

| | X1aY1 | X1bY1 | X1cY1 | X2Y1 | X2aY1 | X2bY1 | X2cY1 | X3Y1 | X3aY1 | X3bY1 | X3cY1 | X4Y1 | X4aY1 | X4bY1 | X4cY1 |
|---|---|---|---|---|---|---|---|---|---|---|---|---|---|---|---|
| X1Y1 | X1aY1a | X1bY1a | X1cY1a | X2Y1a | X2aY1a | X2bY1a | X2cY1a | X3Y1a | X3aY1a | X3bY1a | X3cY1a | X4Y1a | X4aY1a | X4bY1a | X4cY1a |
| X1Y1a | X1aY1b | X1bY1b | X1cY1b | X2Y1b | X2aY1b | X2bY1b | X2cY1b | X3Y1b | X3aY1b | X3bY1b | X3cY1b | X4Y1b | X4aY1b | X4bY1b | X4cY1b |
| X1Y1b | | | | | | | | | | | | | | | |
| X1Y2 | X1aY2 | X1bY2 | X1cY2 | X2Y2 | X2aY2 | X2bY2 | X2cY2 | X3Y2 | X3aY2 | X3bY2 | X3cY2 | X4Y2 | X4aY2 | X4bY2 | X4cY2 |
| X1Y2a | X1aY2a | X1bY2a | X1cY2a | X2Y2a | X2aY2a | X2bY2a | X2cY2a | X3Y2a | X3aY2a | X3bY2a | X3cY2a | X4Y2a | X4aY2a | X4bY2a | X4cY2a |
| X1Y2b | X1aY2b | X1bY2b | X1cY2b | X2Y2b | X2aY2b | X2bY2b | X2cY2b | X3Y2b | X3aY2b | X3bY2b | X3cY2b | X4Y2b | X4aY2b | X4bY2b | X4cY2b |
| | | | | | | | | | | | | | | | |
| X1Y3 | X1aY3 | X1bY3 | X1cY3 | X2Y3 | X2aY3 | X2bY3 | X2cY3 | X3Y3 | X3aY3 | X3bY3 | X3cY3 | X4Y3 | X4aY3 | X4bY3 | X4cY3 |
| X1Y3a | X1aY3a | X1bY3a | X1cY3a | X2Y3a | X2aY3a | X2bY3a | X2cY3a | X3Y3a | X3aY3a | X3bY3a | X3cY3a | X4Y3a | X4aY3a | X4bY3a | X4cY3a |
| X1Y3b | X1aY3b | X1bY3b | X1cY3b | X2Y3b | X2aY3b | X2bY3b | X2cY3b | X3Y3b | X3aY3b | X3bY3b | X3cY3b | X4Y3b | X4aY3b | X4bY3b | X4cY3b |
| | | | | | | | | | | | | | | | |
| X1Y4 | X1aY4 | X1bY4 | X1cY4 | X2Y4 | X2aY4 | X2bY4 | X2cY4 | X3Y4 | X3aY4 | X3bY4 | X3cY4 | X4Y4 | X4aY4 | X4bY4 | X4cY4 |
| X1Y4a | X1aY4a | X1bY4a | X1cY4a | X2Y4a | X2aY4a | X2bY4a | X2cY4a | X3Y4a | X3aY4a | X3bY4a | X3cY4a | X4Y4a | X4aY4a | X4bY4a | X4cY4a |
| X1Y4b | X1aY4b | X1bY4b | X1cY4b | X2Y4b | X2aY4b | X2bY4b | X2cY4b | X3Y4b | X3aY4b | X3bY4b | X3cY4b | X4Y4b | X4aY4b | X4bY4b | X4cY4b |
| | | | | | | | | | | | | | | | |

*FIG. 10c 12*

| X1Y1 | X1aY1 | X1bY1 | X1cY1 | X2Y1 | X2aY1 | X2bY1 | X2cY1 | X3Y1 | X3aY1 | X3bY1 | X3cY1 | X4Y1 | X4aY1 | X4bY1 | X4cY1 |
| --- | --- | --- | --- | --- | --- | --- | --- | --- | --- | --- | --- | --- | --- | --- | --- |
| X1Y1a | X1aY1a | X1bY1a | X1cY1a | X2Y1a | X2aY1a | X2bY1a | X2cY1a | X3Y1a | X3aY1a | X3bY1a | X3cY1a | X4Y1a | X4aY1a | X4bY1a | X4cY1a |
| X1Y1b | X1aY1b | X1bY1b | X1cY1b | X2Y1b | X2aY1b | X2bY1b | X2cY1b | X3Y1b | X3aY1b | X3bY1b | X3cY1b | X4Y1b | X4aY1b | X4bY1b | X4cY1b |
| X1Y1c | | | | X2Y1c | | | | X3Y1c | | | | X4Y1c | | | |
| X1Y2 | X1aY2 | X1bY2 | X1cY2 | X2Y2 | X2aY2 | X2bY2 | X2cY2 | X3Y2 | X3aY2 | X3bY2 | X3cY2 | X4Y2 | X4aY2 | X4bY2 | X4cY2 |
| X1Y2a | X1aY2a | X1bY2a | X1cY2a | X2Y2a | X2aY2a | X2bY2a | X2cY2a | X3Y2a | X3aY2a | X3bY2a | X3cY2a | X4Y2a | X4aY2a | X4bY2a | X4cY2a |
| X1Y2b | X1aY2b | X1bY2b | X1cY2b | X2Y2b | X2aY2b | X2bY2b | X2cY2b | X3Y2b | X3aY2b | X3bY2b | X3cY2b | X4Y2b | X4aY2b | X4bY2b | X4cY2b |
| X1Y2c | | | | X2Y2c | | | | X3Y2c | | | | X4Y2c | | | |
| X1Y3 | X1aY3 | X1bY3 | X1cY3 | X2Y3 | X2aY3 | X2bY3 | X2cY3 | X3Y3 | X3aY3 | X3bY3 | X3cY3 | X4Y3 | X4aY3 | X4bY3 | X4cY3 |
| X1Y3a | X1aY3a | X1bY3a | X1cY3a | X2Y3a | X2aY3a | X2bY3a | X2cY3a | X3Y3a | X3aY3a | X3bY3a | X3cY3a | X4Y3a | X4aY3a | X4bY3a | X4cY3a |
| X1Y3b | X1aY3b | X1bY3b | X1cY3b | X2Y3b | X2aY3b | X2bY3b | X2cY3b | X3Y3b | X3aY3b | X3bY3b | X3cY3b | X4Y3b | X4aY3b | X4bY3b | X4cY3b |
| X1Y3c | | | | X2Y3c | | | | X3Y3c | | | | X4Y3c | | | |
| X1Y4 | X1aY4 | X1bY4 | X1cY4 | X2Y4 | X2aY4 | X2bY4 | X2cY4 | X3Y4 | X3aY4 | X3bY4 | X3cY4 | X4Y4 | X4aY4 | X4bY4 | X4cY4 |
| X1Y4a | X1aY4a | X1bY4a | X1cY4a | X2Y4a | X2aY4a | X2bY4a | X2cY4a | X3Y4a | X3aY4a | X3bY4a | X3cY4a | X4Y4a | X4aY4a | X4bY4a | X4cY4a |
| X1Y4b | X1aY4b | X1bY4b | X1cY4b | X2Y4b | X2aY4b | X2bY4b | X2cY4b | X3Y4b | X3aY4b | X3bY4b | X3cY4b | X4Y4b | X4aY4b | X4bY4b | X4cY4b |
| X1Y4c | | | | X2Y4c | | | | X3Y4c | | | | X4Y4c | | | |

| X1Y1 | X1aY1 | X1bY1 | X1cY1 | X2Y1 | X2aY1 | X2bY1 | X2cY1 | X3Y1 | X3aY1 | X3bY1 | X3cY1 | X4Y1 | X4aY1 | X4bY1 | X4cY1 |
|---|---|---|---|---|---|---|---|---|---|---|---|---|---|---|---|
| X1Y1a | X1aY1a | X1bY1a | X1cY1a | X2Y1a | X2aY1a | X2bY1a | X2cY1a | X3Y1a | X3aY1a | X3bY1a | X3cY1a | X4Y1a | X4aY1a | X4bY1a | X4cY1a |
| X1Y1b | X1aY1b | X1bY1b | X1cY1b | X2Y1b | X2aY1b | X2bY1b | X2cY1b | X3Y1b | X3aY1b | X3bY1b | X3cY1b | X4Y1b | X4aY1b | X4bY1b | X4cY1b |
| X1Y1c | X1aY1c |  |  | X2Y1c | X2aY1c |  |  | X3Y1c | X3aY1c |  |  | X4Y1c | X4aY1c |  |  |
| X1Y2 | X1aY2 | X1bY2 | X1cY2 | X2Y2 | X2aY2 | X2bY2 | X2cY2 | X3Y2 | X3aY2 | X3bY2 | X3cY2 | X4Y2 | X4aY2 | X4bY2 | X4cY2 |
| X1Y2a | X1aY2a | X1bY2a | X1cY2a | X2Y2a | X2aY2a | X2bY2a | X2cY2a | X3Y2a | X3aY2a | X3bY2a | X3cY2a | X4Y2a | X4aY2a | X4bY2a | X4cY2a |
| X1Y2b | X1aY2b | X1bY2b | X1cY2b | X2Y2b | X2aY2b | X2bY2b | X2cY2b | X3Y2b | X3aY2b | X3bY2b | X3cY2b | X4Y2b | X4aY2b | X4bY2b | X4cY2b |
| X1Y2c | X1aY2c |  |  | X2Y2c | X2aY2c |  |  | X3Y2c | X3aY2c |  |  | X4Y2c | X4aY2c |  |  |
| X1Y3 | X1aY3 | X1bY3 | X1cY3 | X2Y3 | X2aY3 | X2bY3 | X2cY3 | X3Y3 | X3aY3 | X3bY3 | X3cY3 | X4Y3 | X4aY3 | X4bY3 | X4cY3 |
| X1Y3a | X1aY3a | X1bY3a | X1cY3a | X2Y3a | X2aY3a | X2bY3a | X2cY3a | X3Y3a | X3aY3a | X3bY3a | X3cY3a | X4Y3a | X4aY3a | X4bY3a | X4cY3a |
| X1Y3b | X1aY3b | X1bY3b | X1cY3b | X2Y3b | X2aY3b | X2bY3b | X2cY3b | X3Y3b | X3aY3b | X3bY3b | X3cY3b | X4Y3b | X4aY3b | X4bY3b | X4cY3b |
| X1Y3c | X1aY3c |  |  | X2Y3c | X2aY3c |  |  | X3Y3c | X3aY3c |  |  | X4Y3c | X4aY3c |  |  |
| X1Y4 | X1aY4 | X1bY4 | X1cY4 | X2Y4 | X2aY4 | X2bY4 | X2cY4 | X3Y4 | X3aY4 | X3bY4 | X3cY4 | X4Y4 | X4aY4 | X4bY4 | X4cY4 |
| X1Y4a | X1aY4a | X1bY4a | X1cY4a | X2Y4a | X2aY4a | X2bY4a | X2cY4a | X3Y4a | X3aY4a | X3bY4a | X3cY4a | X4Y4a | X4aY4a | X4bY4a | X4cY4a |
| X1Y4b | X1aY4b | X1bY4b | X1cY4b | X2Y4b | X2aY4b | X2bY4b | X2cY4b | X3Y4b | X3aY4b | X3bY4b | X3cY4b | X4Y4b | X4aY4b | X4bY4b | X4cY4b |
| X1Y4c | X1aY4c |  |  | X2Y4c | X2aY4c |  |  | X3Y4c | X3aY4c |  |  | X4Y4c | X4aY4c |  |  |

| X1Y1 | X1aY1 | X1bY1 | X1cY1 | X2Y1 | X2aY1 | X2bY1 | X2cY1 | X3Y1 | X3aY1 | X3bY1 | X3cY1 | X4Y1 | X4aY1 | X4bY1 | X4cY1 |
|---|---|---|---|---|---|---|---|---|---|---|---|---|---|---|---|
| X1Y1a | X1aY1a | X1bY1a | X1cY1a | X2Y1a | X2aY1a | X2bY1a | X2cY1a | X3Y1a | X3aY1a | X3bY1a | X3cY1a | X4Y1a | X4aY1a | X4bY1a | X4cY1a |
| X1Y1b | X1aY1b | X1bY1b | X1cY1b | X2Y1b | X2aY1b | X2bY1b | X2cY1b | X3Y1b | X3aY1b | X3bY1b | X3cY1b | X4Y1b | X4aY1b | X4bY1b | X4cY1b |
| X1Y1c | X1aY1c | X1bY1c |  | X2Y1c | X2aY1c | X2bY1c |  | X3Y1c | X3aY1c | X3bY1c |  | X4Y1c | X4aY1c | X4bY1c |  |
| X1Y2 | X1aY2 | X1bY2 | X1cY2 | X2Y2 | X2aY2 | X2bY2 | X2cY2 | X3Y2 | X3aY2 | X3bY2 | X3cY2 | X4Y2 | X4aY2 | X4bY2 | X4cY2 |
| X1Y2a | X1aY2a | X1bY2a | X1cY2a | X2Y2a | X2aY2a | X2bY2a | X2cY2a | X3Y2a | X3aY2a | X3bY2a | X3cY2a | X4Y2a | X4aY2a | X4bY2a | X4cY2a |
| X1Y2b | X1aY2b | X1bY2b | X1cY2b | X2Y2b | X2aY2b | X2bY2b | X2cY2b | X3Y2b | X3aY2b | X3bY2b | X3cY2b | X4Y2b | X4aY2b | X4bY2b | X4cY2b |
| X1Y2c | X1aY2c | X1bY2c |  | X2Y2c | X2aY2c | X2bY2c |  | X3Y2c | X3aY2c | X3bY2c |  | X4Y2c | X4aY2c | X4bY2c |  |
| X1Y3 | X1aY3 | X1bY3 | X1cY3 | X2Y3 | X2aY3 | X2bY3 | X2cY3 | X3Y3 | X3aY3 | X3bY3 | X3cY3 | X4Y3 | X4aY3 | X4bY3 | X4cY3 |
| X1Y3a | X1aY3a | X1bY3a | X1cY3a | X2Y3a | X2aY3a | X2bY3a | X2cY3a | X3Y3a | X3aY3a | X3bY3a | X3cY3a | X4Y3a | X4aY3a | X4bY3a | X4cY3a |
| X1Y3b | X1aY3b | X1bY3b | X1cY3b | X2Y3b | X2aY3b | X2bY3b | X2cY3b | X3Y3b | X3aY3b | X3bY3b | X3cY3b | X4Y3b | X4aY3b | X4bY3b | X4cY3b |
| X1Y3c | X1aY3c | X1bY3c |  | X2Y3c | X2aY3c | X2bY3c |  | X3Y3c | X3aY3c | X3bY3c |  | X4Y3c | X4aY3c | X4bY3c |  |
| X1Y4 | X1aY4 | X1bY4 | X1cY4 | X2Y4 | X2aY4 | X2bY4 | X2cY4 | X3Y4 | X3aY4 | X3bY4 | X3cY4 | X4Y4 | X4aY4 | X4bY4 | X4cY4 |
| X1Y4a | X1aY4a | X1bY4a | X1cY4a | X2Y4a | X2aY4a | X2bY4a | X2cY4a | X3Y4a | X3aY4a | X3bY4a | X3cY4a | X4Y4a | X4aY4a | X4bY4a | X4cY4a |
| X1Y4b | X1aY4b | X1bY4b | X1cY4b | X2Y4b | X2aY4b | X2bY4b | X2cY4b | X3Y4b | X3aY4b | X3bY4b | X3cY4b | X4Y4b | X4aY4b | X4bY4b | X4cY4b |
| X1Y4c | X1aY4c | X1bY4c |  | X2Y4c | X2aY4c | X2bY4c |  | X3Y4c | X3aY4c | X3bY4c |  | X4Y4c | X4aY4c | X4bY4c |  |

FIG. 10c 15

| X1Y1 | X1aY1 | X1bY1 | X1cY1 | X2Y1 | X2aY1 | X2bY1 | X2cY1 | X3Y1 | X3aY1 | X3bY1 | X3cY1 | X4Y1 | X4aY1 | X4bY1 | X4cY1 |
|---|---|---|---|---|---|---|---|---|---|---|---|---|---|---|---|
| X1Y1a | X1aY1a | X1bY1a | X1cY1a | X2Y1a | X2aY1a | X2bY1a | X2cY1a | X3Y1a | X3aY1a | X3bY1a | X3cY1a | X4Y1a | X4aY1a | X4bY1a | X4cY1a |
| X1Y1b | X1aY1b | X1bY1b | X1cY1b | X2Y1b | X2aY1b | X2bY1b | X2cY1b | X3Y1b | X3aY1b | X3bY1b | X3cY1b | X4Y1b | X4aY1b | X4bY1b | X4cY1b |
| X1Y1c | X1aY1c | X1bY1c | X1cY1c | X2Y1c | X2aY1c | X2bY1c | X2cY1c | X3Y1c | X3aY1c | X3bY1c | X3cY1c | X4Y1c | X4aY1c | X4bY1c | X4cY1c |
| X1Y2 | X1aY2 | X1bY2 | X1cY2 | X2Y2 | X2aY2 | X2bY2 | X2cY2 | X3Y2 | X3aY2 | X3bY2 | X3cY2 | X4Y2 | X4aY2 | X4bY2 | X4cY2 |
| X1Y2a | X1aY2a | X1bY2a | X1cY2a | X2Y2a | X2aY2a | X2bY2a | X2cY2a | X3Y2a | X3aY2a | X3bY2a | X3cY2a | X4Y2a | X4aY2a | X4bY2a | X4cY2a |
| X1Y2b | X1aY2b | X1bY2b | X1cY2b | X2Y2b | X2aY2b | X2bY2b | X2cY2b | X3Y2b | X3aY2b | X3bY2b | X3cY2b | X4Y2b | X4aY2b | X4bY2b | X4cY2b |
| X1Y2c | X1aY2c | X1bY2c | X1cY2c | X2Y2c | X2aY2c | X2bY2c | X2cY2c | X3Y2c | X3aY2c | X3bY2c | X3cY2c | X4Y2c | X4aY2c | X4bY2c | X4cY2c |
| X1Y3 | X1aY3 | X1bY3 | X1cY3 | X2Y3 | X2aY3 | X2bY3 | X2cY3 | X3Y3 | X3aY3 | X3bY3 | X3cY3 | X4Y3 | X4aY3 | X4bY3 | X4cY3 |
| X1Y3a | X1aY3a | X1bY3a | X1cY3a | X2Y3a | X2aY3a | X2bY3a | X2cY3a | X3Y3a | X3aY3a | X3bY3a | X3cY3a | X4Y3a | X4aY3a | X4bY3a | X4cY3a |
| X1Y3b | X1aY3b | X1bY3b | X1cY3b | X2Y3b | X2aY3b | X2bY3b | X2cY3b | X3Y3b | X3aY3b | X3bY3b | X3cY3b | X4Y3b | X4aY3b | X4bY3b | X4cY3b |
| X1Y3c | X1aY3c | X1bY3c | X1cY3c | X2Y3c | X2aY3c | X2bY3c | X2cY3c | X3Y3c | X3aY3c | X3bY3c | X3cY3c | X4Y3c | X4aY3c | X4bY3c | X4cY3c |
| X1Y4 | X1aY4 | X1bY4 | X1cY4 | X2Y4 | X2aY4 | X2bY4 | X2cY4 | X3Y4 | X3aY4 | X3bY4 | X3cY4 | X4Y4 | X4aY4 | X4bY4 | X4cY4 |
| X1Y4a | X1aY4a | X1bY4a | X1cY4a | X2Y4a | X2aY4a | X2bY4a | X2cY4a | X3Y4a | X3aY4a | X3bY4a | X3cY4a | X4Y4a | X4aY4a | X4bY4a | X4cY4a |
| X1Y4b | X1aY4b | X1bY4b | X1cY4b | X2Y4b | X2aY4b | X2bY4b | X2cY4b | X3Y4b | X3aY4b | X3bY4b | X3cY4b | X4Y4b | X4aY4b | X4bY4b | X4cY4b |
| X1Y4c | X1aY4c | X1bY4c | X1cY4c | X2Y4c | X2aY4c | X2bY4c | X2cY4c | X3Y4c | X3aY4c | X3bY4c | X3cY4c | X4Y4c | X4aY4c | X4bY4c | X4cY4c |

FIG. 10c 16

METHOD FOR ACCELERATING THE COMPUTATIONAL SPEED OF A COMPUTER ALGORITHM

CROSS REFERENCE TO RELATED PROVISION APPLICATION

This application claims the benefit of U.S. Provisional Patent Application No. 60/698,877 filed on Jul. 12, 2005, the disclosure of which is incorporated herein by reference in its entirety.

BACKGROUND OF THE INVENTION

The present invention generally relates to improving the computational speed of a computer algorithm. The present invention has particular applicability in the area of cryptographic algorithms, including Rivest, Shamir and Adleman ("RSA") encryption algorithms.

Cryptographic systems are ubiquitous in today's computer-driven society. Such systems are used to provide secure communications.

Public-key cryptography, and the widely-used RSA encryption technique in particular, is increasingly important to data security these days. As discussed in greater detail hereinafter, public-key cryptography (RSA as a worldwide standard) generally provides the means for two remote parties to share information without transmitting a code (a "key") that a would-be eavesdropper could use to break the encryption. RSA has withstood about 20 years of cryptoanalysis (breaking ciphertext—that is, recovering plaintext without knowing the key).

Most of today's cryptographic schemes involve symmetric (secret) key algorithms or asymmetric (public) key algorithms.

In symmetric-key cryptographic systems, the sender of information uses the same key to encrypt the information that the recipient of the information uses to decrypt it (that is, the same key is used to encode and decode information). The encoding procedure consists of a sequence of actions on the source data using the key, the decoding procedure uses the same key to perform the reverse actions on the encoded information. Symmetric-key systems require that each sender and recipient exchange the shared key in a secure manner. To decode the encoded information without the shared key is ostensibly impossible.

Compared to public-key algorithms, symmetric-key algorithms are very fast. For this reason, symmetric-key encryption is preferred for encrypting large amounts of data.

However, problems arise if information encoded using the symmetric-key approach is transmitted via an ordinary non-secure channel. Because both the sender and the recipient must have the same key, it becomes necessary to employ an additional secure channel to transmit the key. As a result, the system becomes fragile and administrative complications arise.

DES is a symmetric-key algorithm that, historically, has been widely used but that, recently, has become obsolete due to its vulnerability. On or about October, 2000, NIST announced that Rijndael had been selected as the proposed AES, and underwent the process of being made the official standard. Today, Rijndael is considered to be the most commonly used symmetric-key algorithm.

The idea of public-key cryptography (asymmetric algorithm) was introduced in 1976 by Whitfield Diffie and Martin Hellman in order to solve the key management problem. In their concept, each person holds a pair of keys—one a public key and the other a private key. Each public key is published while the private key is kept secret. The sender encrypts information using the public key of the recipient; the recipient uses the private key for decrypting the encrypted information.

The need for the sender and recipient to share secret information is eliminated in public-key cryptographic systems as all communications involve only public keys and no private key is ever transmitted or shared. The potential problem associated with symmetric-key systems that an unauthorized party will intercept the secret key is avoided.

A requirement of public-key systems is that public keys are associated with their users in a trusted (authenticated) manner (for instance, in a trusted directory). Anyone can send a confidential message by just using public information, but the message can be decrypted only with a private key, which is in the sole possession of the intended recipient. Furthermore, public-key cryptography can be used not only for privacy (encryption), but also for authentication (digital signatures).

RSA is a public-key system used for both encryption and authentication purposes. As is understood by those of ordinary skill in the cryptographic arts, RSA works as follows: take two large primes, p and q, and find their product $n=pq$; n is called the modulus. Choose a number, e, less than n and relatively prime to $(p-1)(q-1)$, which means that e and $(p-1)(q-1)$ have no common factors except 1. Find another number d such that $(ed-1)$ is divisible by $(p-1)(q-1)$. The values e and d are called the public and private exponents, respectively. The public key is the pair $(n,e)$; the private key is $(n,d)$. The factors p and q may be kept with the private key or destroyed.

By way of example, suppose that Alice wants to send a message m to Bob using RSA encryption. Alice creates the cipher text c by exponentiating: $c=m^e \bmod n$, where e and n are Bob's public key. Alice sends c to Bob. To decrypt, Bob exponentiates: $m=c^d \bmod n$; the relationship between e and d ensures that Bob correctly recovers m. Since only Bob knows d, only Bob can decrypt message m.

As another example of RSA in the context of authentication, suppose that Alice wants to send a message m to Bob in such a way that Bob is assured that the message is authentic and is from Alice. Alice creates a digital signature s by exponentiating: $s=m^d \bmod n$, where d and n are Alice's private key. Alice sends m and s to Bob. To verify the signature, Bob exponentiates and checks that the message m is recovered: $m=s^e \bmod n$, where e and n are Alice's public key.

A disadvantage of public-key cryptographic systems in general is that they require large amounts of computer processing power, and, as a consequence, are slow. It therefore comes as no surprise that the biggest obstacle (disadvantage) with RSA is its low speed (which is directly attributable to the fact that the RSA public-key algorithm requires large amounts of computer processing power).

Recognizing that public-key encryption algorithms such as RSA are computationally intensive, some conventional encryption systems provide users with the capability to use public-key encryption to securely exchange a shared symmetric key. However, such hybrid approaches have their associated disadvantages, and there remains a need for a faster public-key encryption algorithm (e.g., a faster RSA algorithm).

The present invention satisfies the foregoing need for faster computer algorithms by providing a technique for accelerating the computational speed of a computer algorithm, such as, for example, a cryptographic algorithm (e.g., an RSA algorithm), without affecting the underlying nature of the algorithm—i.e., the way the algorithm works and the results generated thereby.

It will be appreciated that, in addition to the acceleration of encryption algorithms, the present invention has applicability with respect to video compression algorithms, motion detection and compression algorithms, optical character recognition ("OCR") algorithms, audio compression algorithms, digital photography zooming applications, and other algorithms/applications where acceleration of computational speed is desirable.

SUMMARY OF THE INVENTION

Generally speaking, a new method for accelerating the computational speed of a computer algorithm is provided.

In accordance with one embodiment of the present invention, the inventive method for accelerating the speed of a computer algorithm can be applied to an encryption algorithm (e.g., RSA) based on the following general logic:

1. obtain initial data to encrypt
2. set index α to FALSE
3. take one (1) element from a file
4. if index α is set for TRUE, go to step 11
5. verify whether or not data exist in "STB" -- if yes, go to step 11
6. insert index to STB
7. encrypt (e.g., using RSA algorithm)
8. insert encrypted element to STB
9. if STB is filled, set index α to TRUE
10. if no EOF (end of file), then go to step 3
11. search for an encrypted element in STB using index as a criterion and take encrypted element out of STB (with a copy of the element remaining in STB)
12. add encrypted element to the file
13. if no EOF, then go to step 3
14. end According to another embodiment of the present invention, a method and system for effecting secure information communications utilizing an accelerated information encryption algorithm can be provided.

In accordance with a further embodiment of the present invention, the method for accelerating the computational speed of a computer algorithm of the present invention can be applied to a video compression algorithm.

In accordance with a still further embodiment of the present invention, the method for accelerating the computational speed of a computer algorithm of the present invention can be applied to an OCR algorithm.

In accordance with yet a further embodiment of the present invention, the method for accelerating the computational speed of a computer algorithm of the present invention can be applied to an audio compression algorithm.

In accordance with another embodiment of the present invention, the method for accelerating the computational speed of a computer algorithm of the present invention can be applied to a digital photography zooming application.

In accordance with a still further embodiment of the present invention, the method for accelerating the computational speed of a computer algorithm of the present invention can be applied to a motion detection and compression application.

The foregoing and other aspects, features and advantages of the invention will in part be obvious and will in part be apparent from this disclosure and accompanying drawings.

The present invention accordingly comprises the various steps and the relation of one or more of such steps with respect to each of the others, and the system and software embody features which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 6a-6e show test results (in both chart and graphical form) illustrating the advantageous computational acceleration capabilities of the inventive algorithm in cryptography applications (including RSA);

FIGS. 7a-7g illustrate acceleration of the speed of video compression/decompression utilizing the inventive algorithm in accordance with an alternative embodiment of the present invention;

DETAILED DESCRIPTION OF THE PREFERRED EMBODIMENTS

An embodiment of a method for accelerating the computational speed of a computer algorithm in accordance with the present invention can be effected in accordance with the following general logic, which logic is described as being applied in the context of, for example, an RSA algorithm—it should be appreciated, however, that the present invention also has application with respect to algorithms other than encryption algorithms, of which RSA is but one example:

1. obtain initial data to encrypt
2. set index α to FALSE
3. take one (1) element from a file
4. if index α is set for TRUE, go to step 11

Figure 2:
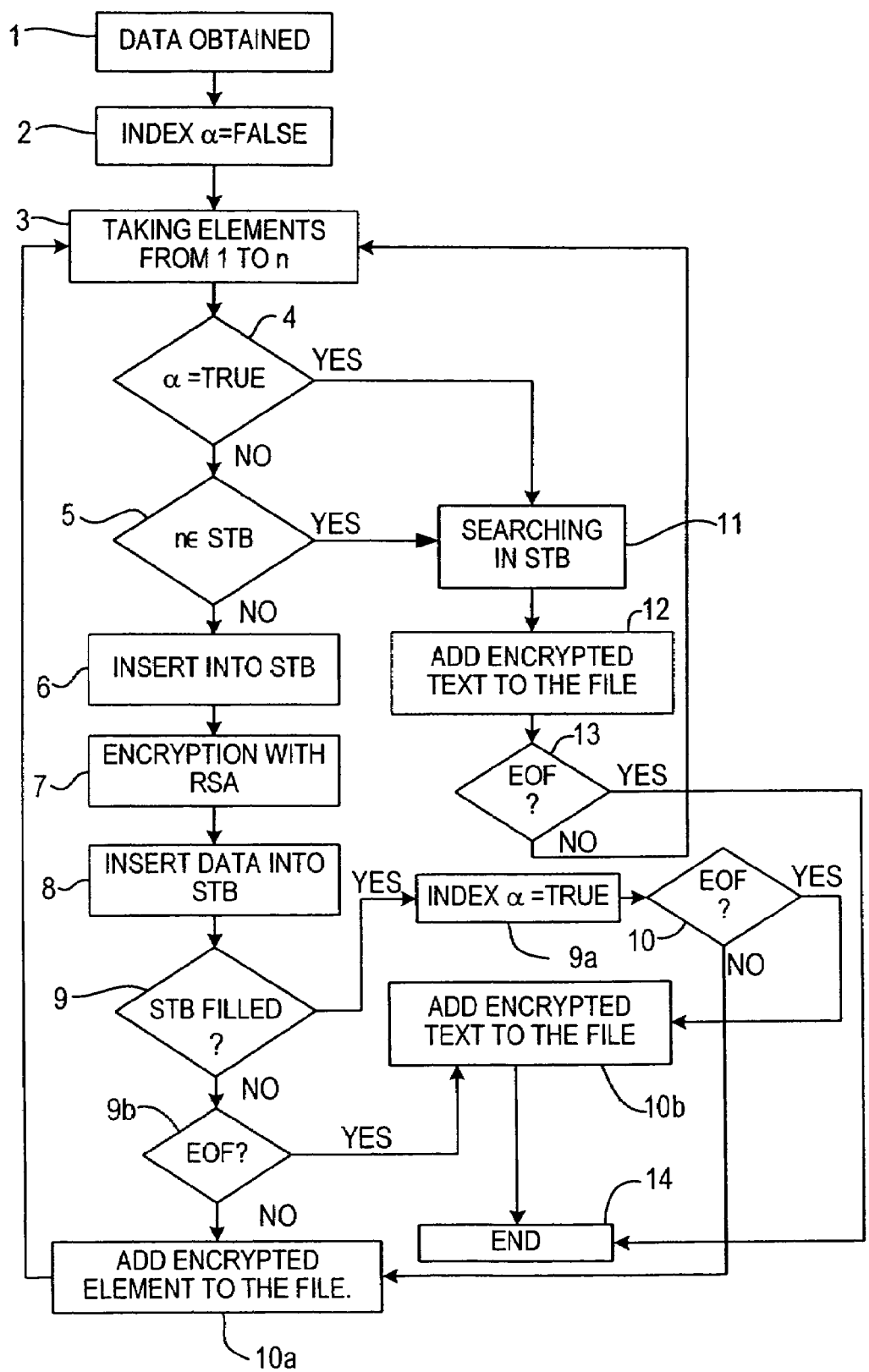
FIG. 2 is a flow diagram illustrating logic for accelerating the computational speed of an algorithm according to one embodiment of the present invention.

-continued 5. verify whether or not data exist in "STB" -- if yes, go to step 11
6. insert index to STB
7. encrypt (e.g., with RSA)
8. insert encrypted element to STB
9. if STB is filled, set index α to TRUE
10. if no end-of-file ("EOF"), then go to step 3
11. search for an encrypted element in STB using index as a criterion and take encrypted element out of STB (with a copy of the element remaining in STB)
12. add encrypted element to the file
13. if no EOF, then go to step 3
14. end In accordance with the foregoing, reference is now made to FIG. 2 which is a flow diagram illustrating logic for accelerating the computational speed of an algorithm according to one embodiment of the present invention. In step 1, data are obtained (e.g., one element at a time) from a file of data (e.g., a computer database) or other source. The data are preferably converted to numbers, which could be an index in an "STB" data structure (e.g., an array) directly (without modification) or indirectly (with modification—i.e., after processing).

Figure 1:
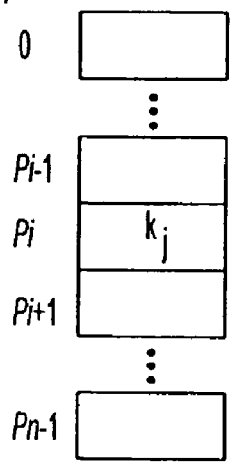
FIG. 1 is a mathematical description of an STB data structure used in connection with a method for accelerating the computational speed of an algorithm in accordance with one embodiment of the present invention.
Figure 1:
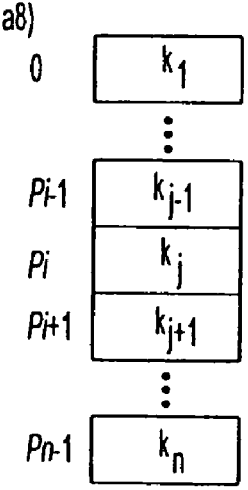

FIG. 1 sets forth a mathematical description of an STB structure. Referring to FIG. 1, (a1), n is a variable included in the interval from 0 to +∞. N belongs to the class of natural numbers including zero (0). n indicates the next data element. Referring to (a2), i is a variable included in the interval from 0 to n−1; j is a variable included in the interval from 1 to n. i and j belong to the class of natural numbers. (a3) is the assignment of a difference between a subsequent element number and its index. Referring to (a4), numbers p and k are variables which hold data; they may be included in the class of whole numbers. (a5) is an example of the use and filling (stabilization) of STB; it is a chosen or taken sign (in this example, a number). (a6) describes a stabilization level of the STB structure. Like (a5), (a7) is an example of the use and filling (stabilization) of STB—but this is the next step (it may be the last step of the stabilization process (but not of the inventive algorithm)). Like (a6), (a8) describes a stabilization level of the STB structure—however, (a8) is a next step. Referring to (b) in FIG. 1, n is numbered from 0, and j is numbered from 1. Individual elements start at 0, for example the element at position 0 is the first element.

Figure 3A:
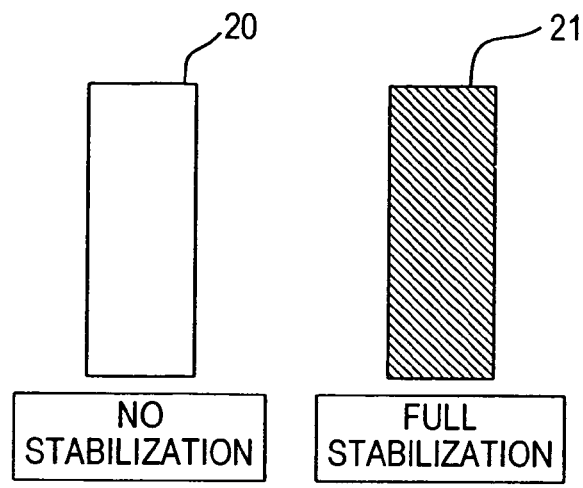
FIGS. 3a and 3b illustrate stabilization of an STB data structure in connection with a method for accelerating the computational speed of an algorithm in accordance with one embodiment of the present invention.
Figure 3B:
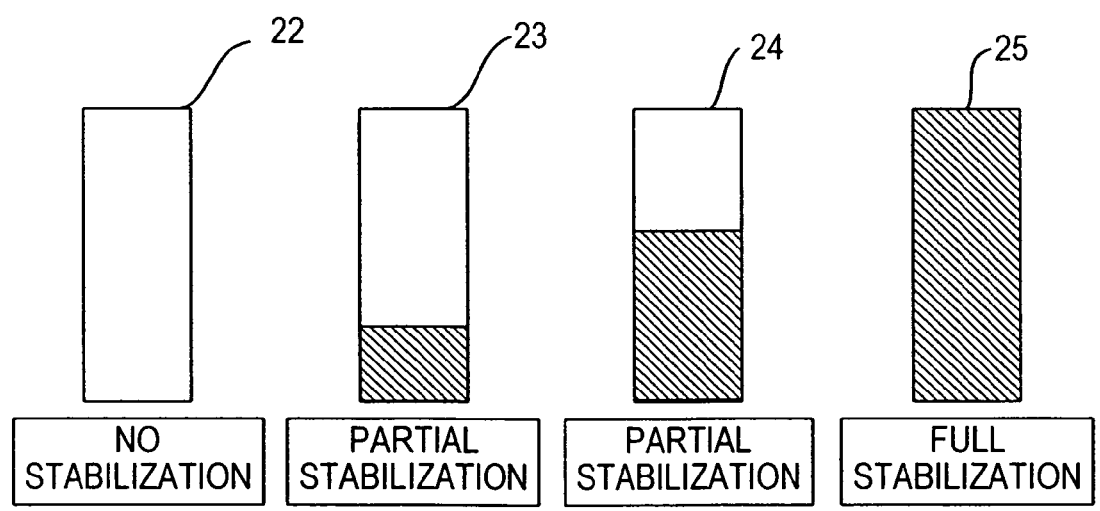

Referring to FIG. 3a, with respect to stabilization by index alpha α, 0 can equate to no stabilization or a FALSE state (20), and 1 can equate to stabilization or a TRUE state (21). FIG. 3b illustrates stabilization in which a value from a certain interval is inserted into index α (no stabilization (22), partial stabilization (23 and 24) and full stabilization (25)).

Referring back to FIG. 2, in step 2, index α, preferably a number from the interval (+∞, −∞) which informs about the state of STB filling, is set to FALSE.

index α—a∈Z or a={0, 1} (FALSE, TRUE) or a∈R

Alpha (α) may be a number which is included in the class of whole numbers (i.e., a number that is not a fraction). Alpha (α) may also be a Boolean value, that is, a binary (1 bit) value. In this case, α may determine whether or not STB is stabilized (TRUE or FALSE, where, for example, TRUE can mean stabilized and FALSE can mean not stabilized, or vice-versa). In this form, α is not determinative of other forms of stabilization (e.g., intermediate values or only final state).

In the case where a belongs to the class of real numbers, it may mean that α can be any number (fractional or whole number). In such case, α may indicate and/or inform individual parts of verifying functions that the stabilization may be in a certain intermediate state (not only from the interval 0, 1). It may be, for example, a concrete value between 0 and 1, which is some intermediate state between 0 and 1 (1 bit). It should be appreciated that a may also include other values, depending on fulfilled and/or expected functions.

The property of STB may be, for example, the number of elements or capacity, or STB may have no limitations; it may have structure that will allow the control of STB capacity. Because of this, it is possible to establish percentage stabilization of an algorithm; it may also be used for other purposes.

In step 3, one element is taken to encrypt. The element may, for example, be a number.

Index α is verified in step 4—for example, whether it is set to TRUE or FALSE. Index α indicates the state of capacity and/or the state of stabilization. It informs as to which elements may be encrypted (and it may be modified in step 9a).

Besides the conditions in step 4, in the case where index α indicates a lack of stabilization, then, stabilization of STB is preferably verified in step 5 (data comparison). If data exist in STB, then step 11 is implemented; if data are contradictory or there are no data, there is no jump to step 11. During a subsequent (e.g., next) algorithm cycle or part of it, a conditional jump to step 6 may be effected.

In step 6, an element (unmodified or modified) or a part of an element is inserted into STB in the case where there is no data or there is contradictory data (as determined in step 5).

At step 7, encryption is effected—for example, using a standard RSA algorithm without modifications.

At step 8, an element (encrypted) is inserted into STB. This means that in view of subsequent jumps from steps 10 to 3 to 4 to 11, there will be no indication of a lack of data in step 5, and, consequently, a jump to step 11 of the inventive algorithm will be implemented.

At step 9, if STB is filled, index α is set to TRUE (step 9a), and the process then moves to step 10 to determine if an EOF condition is present. Step 9 functions in a similar way to step 8, except for the fact that no element is inserted into STB but index α is set (capacity). Index α may consist only of values of Boolean type, that means 1 bit connotes filling (informational magnitude for step 4) or any other type of data such as, for example, INTEGER, LONGINT, REAL, EXTENDED or DOUBLE.

If, at step 9, STB is not filled and an EOF is indicated (step 9b), the encrypted element is added to the file (step 10a) and the algorithm ends (step 14). If, at step 9, STB is not filled and an EOF is not indicated (step 9b), the encrypted element is added to the file (step 10a) and step 3 is revisited.

If, at step 10, an EOF is not indicated, the encrypted element is added to the file (step 10a) and step 3 is revisited. If an EOF is indicated at step 10, the encrypted element is added to the file (step 10b) and the algorithm ends (step 14).

At step 11, a search for an encrypted element in STB is conducted using index α as a criterion, and the encrypted element is taken out of STB (with a copy of the element remaining in STB). Step 11 can be accessed from steps 4 and 5. In the case of jump from step 4, after verifying index α, an immediate search for an element in STB begins. This also occurs in the case of a jump from step 5, however, in this situation there is a certainty that an element searched for exists in STB; accordingly, in this situation, a search for the element may be omitted and the process may move on to data collection from STB.

At step 12, the encrypted element is added to the file or stream of information and/or any other desired location.

If, at step 13, an EOF is not indicated, step 3 is revisited. If an EOF is indicated, the inventive algorithm ends at step 14 with an encrypted file.

Figure 4:
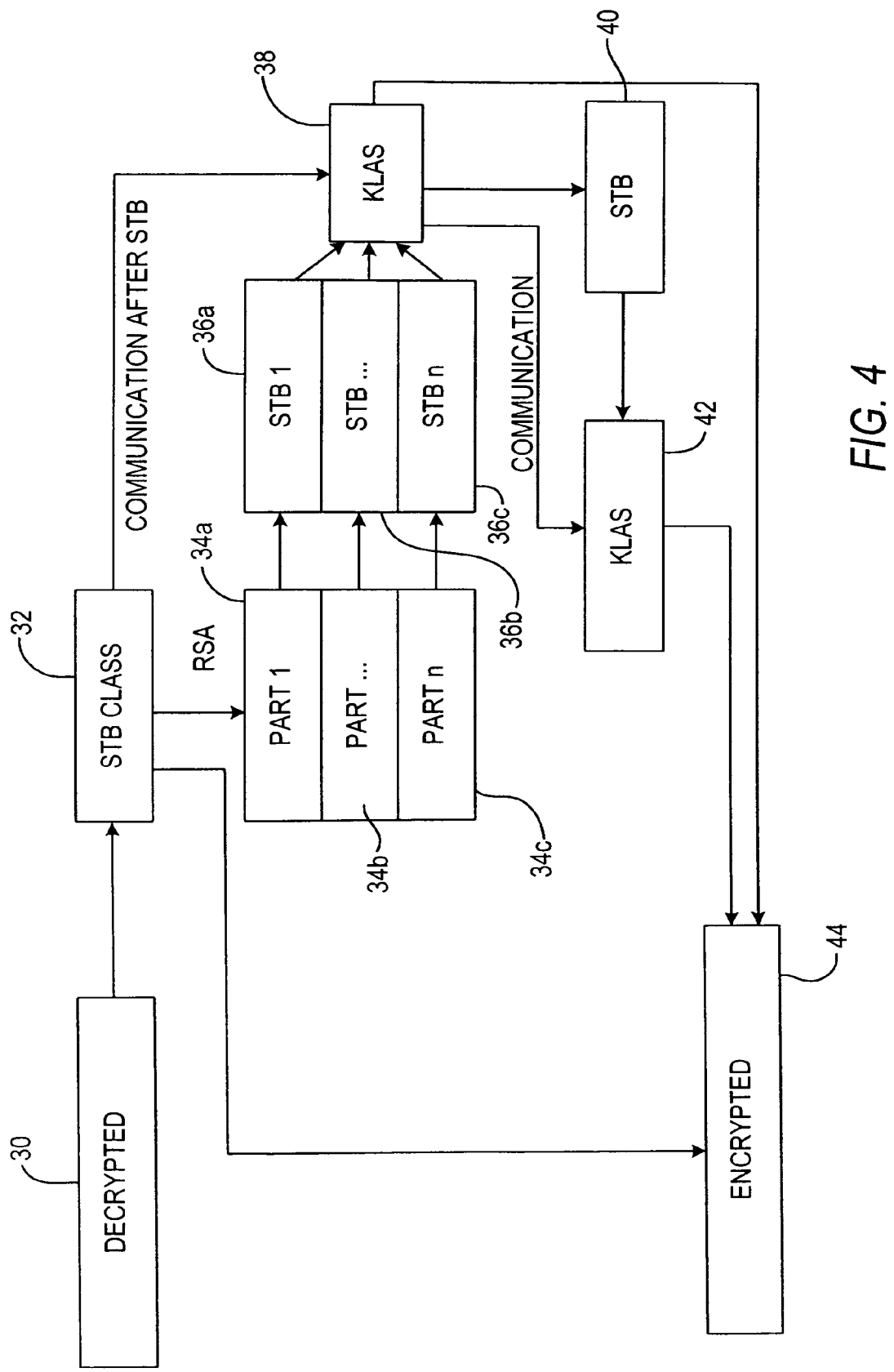
FIG. 4 is a schematic diagram illustrating data flow in an accelerated encryption algorithm (applied within and outside of RSA) in accordance with one embodiment of the present invention.

Referring now to FIG. 4, a schematic diagram illustrating an encryption process (within and outside of RSA) utilizing the inventive algorithm in accordance with one embodiment of the present invention is shown. Public and private keys are created and data for encryption are obtained (step 30) (e.g., from a hard drive, FDD, Pen Drive or other suitable source).

At step 32, the STB structure is provided and contains an STB object in the form of indices (numbers that are pointing to certain elements within the STB structure). In this example, 34*a* is assigned to 36*a*, 34*b* is assigned to 36*b* and 34*c* is assigned to 36*c*. STB is probed on an element-by-element basis to determine if encrypted elements are present, and, if not present, the structure is filled (e.g., sequentially) with RSA encrypted elements as appropriate. At step 38 (classification), the inventive algorithm decides whether to proceed to fill the entire STB structure with encrypted data elements until the STB structure is stabilized before the encrypted file is created (see steps 40 and 42, encrypted bytes are added from STB to the file—this can offer additional speed advantages), or to create the encrypted file as the STB structure is filled (before it is fully stabilized). Also, at this point, the algorithm decides whether to stop or to continue. In any event, the ultimate result (step 44) is a completed encrypted file.

The following is an illustrative example of RSA encryption utilizing the inventive algorithm in connection with only one file consisting of five bytes (B1-B5):

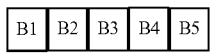

It should be appreciated that before the inventive algorithm is effected, for the purpose of RSA, public and private keys are created.

Index α (which informs about the state of capacity or stabilization of STB) is set to FALSE—which, in this example, can indicate that the encrypted element is not in STB.

The inventive algorithm takes the first byte (B1) and, using pointers and arrays, checks how this byte would appear when encrypted with standard RSA. The algorithm then verifies whether or not encrypted B1 is in STB. If encrypted B1 is not in STB, the algorithm (index α set to FALSE) takes B1 from the source file, encrypts it using a standard RSA algorithm resulting in byte E1 and adds it to STB.

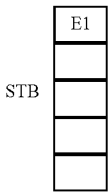

Next, encrypted byte E1 is added to the encrypted file. If no EOF is indicated, the algorithm continues to the next byte.

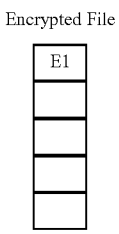

The inventive algorithm takes the second byte B2 and, using pointers and arrays, checks how this byte would appear when encrypted with standard RSA. The algorithm then verifies whether or not encrypted B2 is in STB. If encrypted B2 is not there, the algorithm (index α set to FALSE) takes B2 from the source file, encrypts it using a standard RSA algorithm resulting in E2 and adds it to STB.

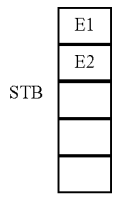

Next, already encrypted byte E2 is added to the encrypted file. If no EOF is indicated, the algorithm continues to the next byte.

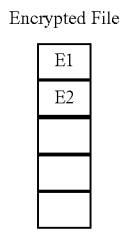

The same process is repeated for the third byte B3 resulting in encrypted E3 inserted into STB and added to the encrypted file.

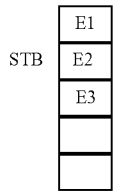

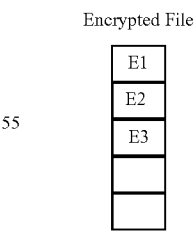

Next, byte B4 is taken from the source file. The inventive algorithm, using pointers and arrays, checks how this byte would appear when encrypted using standard RSA. The algorithm then verifies whether or not encrypted B4 is in STB. In the case where encrypted B4 is in STB (here, it is the same as E2), nothing is added to STB.

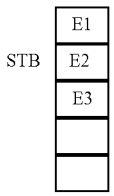

E4 is added to the encrypted file (E4=E2). If no EOF is indicated, the algorithm continues to the next byte.

Encrypted File

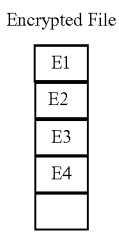

The inventive algorithm takes the fifth byte (B5) and, using pointers and arrays, checks how this byte would appear when encrypted using standard RSA. The inventive algorithm then verifies whether or not encrypted B5 is in STB. If encrypted B5 is not there, the algorithm (index α set FALSE) takes B5 from the source file, encrypts it using a standard RSA algorithm resulting in E5 and adds it to STB.

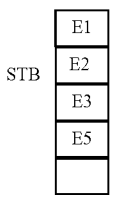

Next, the already encrypted byte E5 is added to the encrypted file, and the algorithm reaches the EOF. The process ends with a completed encrypted file.

Encrypted File

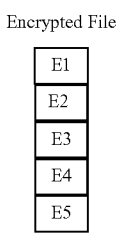

It should be understood that the inventive algorithm can also be implemented outside of an RSA encryption process. In general terms, the main difference is that the STB structure is first filled with encrypted bytes and then, after that process is finished and STB is stabilized, the encrypted file is created (encrypted bytes are added from STB to the file).

Figure 5:
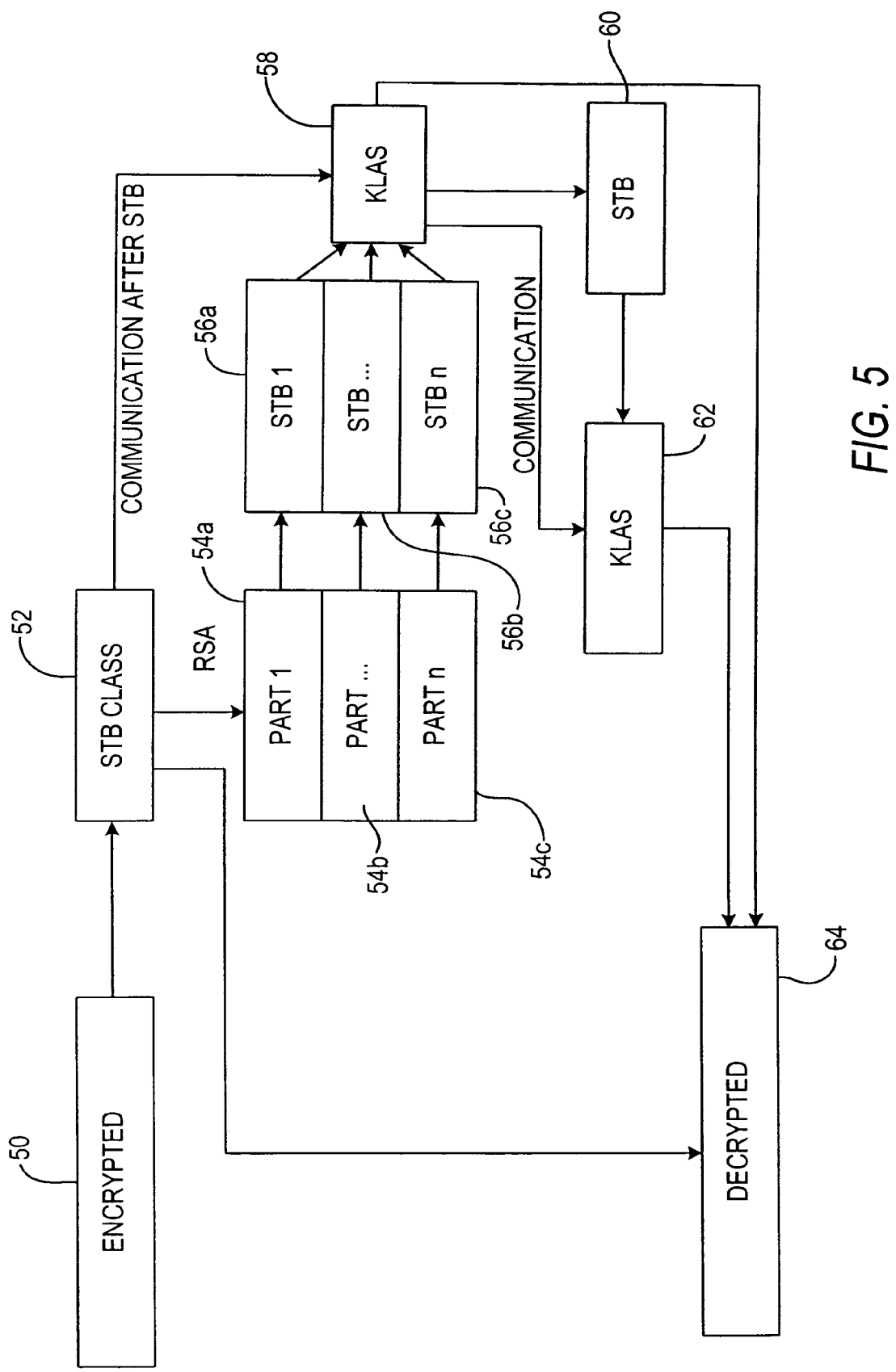
FIG. 5 is a schematic diagram illustrating data flow in an accelerated decryption algorithm (applied within and outside of RSA) in accordance with one embodiment of the present invention.

Referring now to FIG. 5, a schematic diagram illustrating a decryption process (within and outside of RSA) utilizing the inventive algorithm in accordance with one embodiment of the present invention is shown. Encrypted data for decryption are obtained (step 50) (e.g., from a hard drive, FDD, Pen Drive or other suitable source). At step 52, the STB structure is provided and contains an STB object in the form of indices (numbers that are pointing to certain elements within the STB structure). In this example, 54*a* is assigned to 56*a*, 54*b* is assigned to 56*b* and 54*c* is assigned to 56*c*. STB is probed on an element-by-element basis to determine if decrypted elements are present, and, if not present, the structure is filled (e.g., sequentially) with decrypted elements as appropriate. At step 58 (classification), the inventive algorithm decides whether to proceed to fill the entire STB structure with decrypted data elements until the STB structure is stabilized before the decrypted file is created (see steps 60 and 62, decrypted bytes are added from STB to the file—this can offer additional speed advantages), or to create the decrypted file as the STB structure is filled (before it is fully stabilized). Also, at this point, the algorithm decides whether to stop or to continue. In any event, the ultimate result (step 64) is a completed decrypted file.

The following is an illustrative example of RSA decryption (of the below encrypted file consisting of five bytes) utilizing the inventive algorithm:

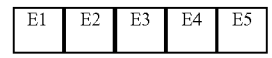

It should be remembered that, before the encryption process began, two keys: a public key and a private key were created—the private key for use in the decryption process.

The inventive algorithm takes first byte (E1) from the encrypted file and inserts it into a variable. Using pointers and arrays the algorithm checks how this byte (E1) would appear when decrypted. The algorithm verifies whether or not decrypted E1 is in STB. If not, encrypted E1 is decrypted using a standard RSA algorithm resulting in B1, which is inserted into STB. Next, already decrypted byte B1 is added to the decrypted file. If no EOF is indicated, the algorithm continues to process the next byte.

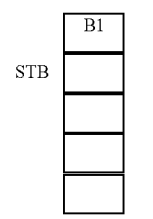

Decrypted File

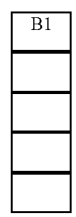

The same procedure is repeated for encrypted bytes E2 and E3 resulting in the following outcome:

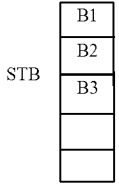

Decrypted File

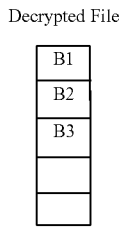

The inventive algorithm takes fourth byte (E4) from the encrypted file and inserts it into a variable. Using pointers and arrays, the algorithm checks how this byte (E4) would appear when decrypted. The algorithm then verifies whether or not decrypted E4 is in STB. If decrypted E4 is in STB (B2), nothing is added to STB, and B4 is added to the decrypted file (B4=B2). If no EOF is indicated, the algorithm proceeds to process the next byte.

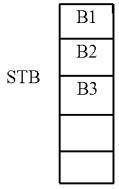

Decrypted File

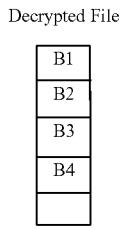

The inventive algorithm takes fifth byte (E5) from the encrypted file and inserts it into a variable. Using pointers and arrays, the algorithm checks how this byte (E5) would appear when decrypted. The algorithm then verifies whether or not decrypted E5 is in STB. If E5 is not in STB, encrypted E5 is decrypted using standard RSA resulting in B5 which is inserted into STB. Next, already decrypted byte B5 is added to the decrypted file. When EOF is reached, the process ends with a complete decrypted file.

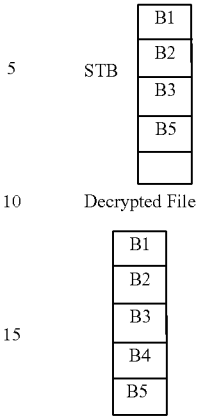

It should be understood that the inventive algorithm can also be implemented outside of an RSA decryption process. In general terms, like with the encryption process, the main difference is that the STB structure is first filled with decrypted bytes and then, after that process is finished and STB is stabilized, the decrypted file is created (decrypted bytes are added from STB to the file).

The present invention also contemplates a method and system for implementing an accelerated algorithm. For example, a cryptographic method and system running an accelerated algorithm (e.g., an RSA algorithm) according to the present invention can be provided to allow users at various locations to communicate securely and efficiently.

Users may communicate with each other using conventional means such as, for example, personal computers, portable computers, mainframe computers, networked computers or terminals, telecommunications equipment, handheld computers, personal digital assistants or cellular telephones. Multiple users may use the same device. For example, a group of users may share the use of a single computer terminal that is connected to a host computer in a local area network. It should be understood that the foregoing are merely illustrative examples of the type of platforms that may be employed—user equipment may be based on any suitable equipment.

User equipment may be interconnected by a communications network such as, for example, the Internet, a local area network, a wide area network, a public switched telephone network, a virtual private network, a wired network, a wireless network, dedicated leased lines, a network based on fiber-optic or cable paths or other wired or wireless paths, or a network formed using any other suitable network technology or a combination of such networks. Various computing devices may be connected to such a network to support the features of the system application of the present invention.

In some arrangements, such computing equipment may be used to provide the functions of a server in a client-server architecture. A typical server-based arrangement may use one or more computers to provide the functions of a server. A server may be formed using a single computer or multiple computers. The functions of a single server may be provided by computers that are distributed over a number of different physical locations.

Some user activities may require manual intervention. For example, a person who desires to send an encrypted message must compose the message before it is encrypted and sent to a recipient. Other user activities may be automated or semi-automated—taking place with little or no human intervention.

Computer programs implicated by the present invention can be embodied as source code and undergo compilation for implementation on processing devices or a system of devices, or can be embodied as object code, for example. Preferably, the computer programs are stored on carrier media in machine or device readable form, for example in solid-state memory or magnetic memory such as disk or tape.

It should be appreciated that the acceleration of computational speed provided by the algorithm according to the present invention permits encryption of large amounts of data at high speeds while enabling longer, safer keys—minimizing security threats to RSA keys.

FIGS. 6a-6e set forth test results (in both chart and graphical form) illustrating the advantageous computational acceleration capabilities of the inventive algorithm in cryptography applications (including RSA). The software specifications used for testing were as follows:
Win XP Pro 32-bit with SP2

The hardware specifications used for testing were as follows:
Motherboard—Tyan Thunder i7525 S2676 UANRF
CPU—dual Xeon 3.6 GHz 1 MB Cache 64 bit
Memory—2 GB RAM ECC DDR 2 400 MHz
Video—ATI Radeon X700 256 MB RAM
Audio—Sound Blaster Audigy 1 OEM
Power—Antec 550W Testing involved the use of only one processor (one-thread process). Because of a limitation in data transmission speed in the hardware used for testing, the results of the tested encryption/decryption process were created in the processor's cache and promptly removed to avoid a bottleneck effect. Otherwise, the speed of the encryption/decryption process would be limited to the speed of the slowest component (hard drive, memory, processor's cache).

FIG. 6a is a chart illustrating the advantageous computational acceleration capabilities of the inventive algorithm in RSA cryptography applications (with and without the use of a mathematical library).

FIG. 6b is a chart illustrating the computational acceleration capabilities of the inventive algorithm with respect to specific cryptography algorithms.

FIG. 6c is a graphical representation of the incremental speed of accelerated RSA encryption (with mathematical library) using the inventive algorithm with respect to key length.

Figure 6D:
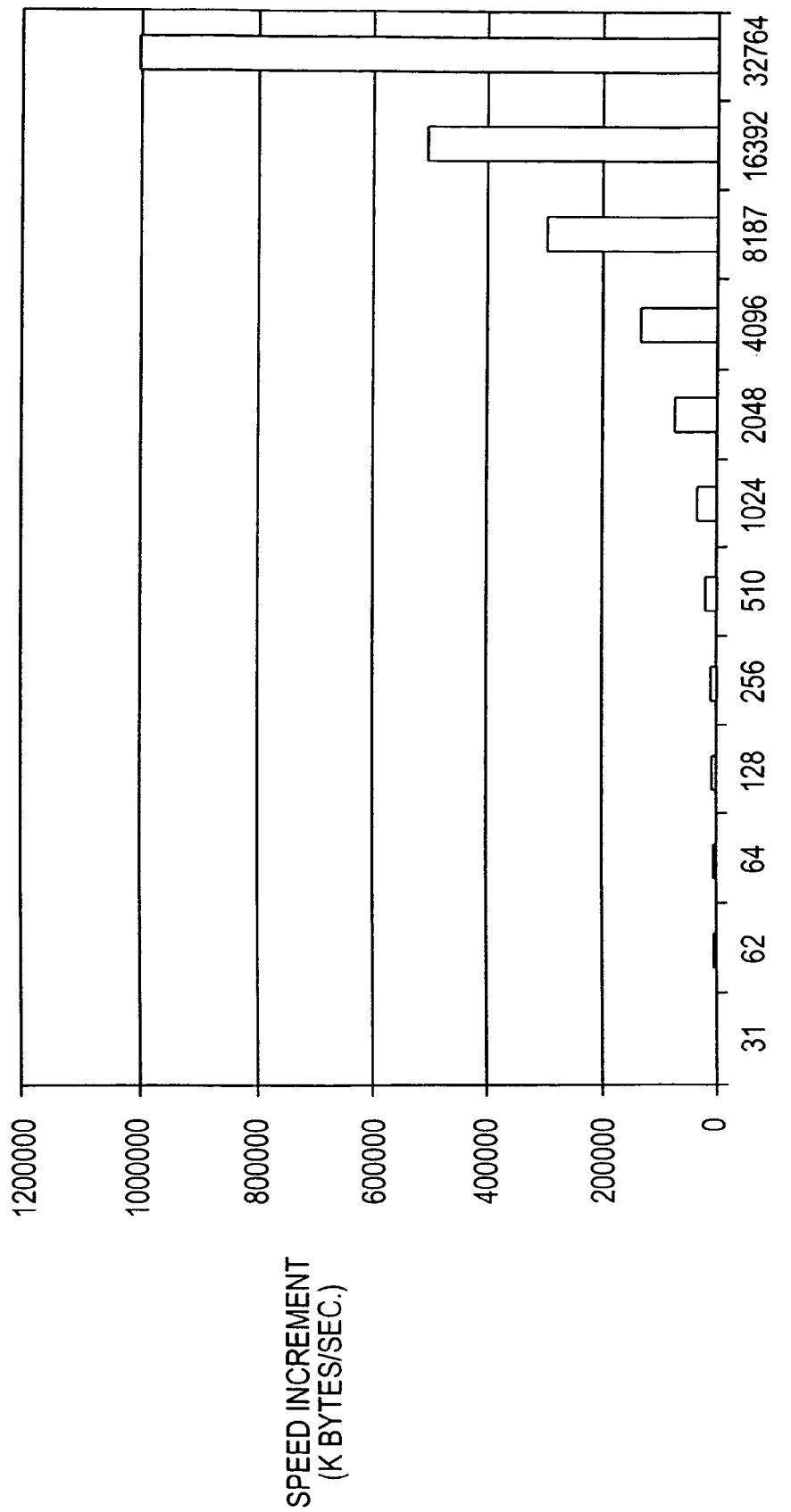

FIG. 6d is a graphical representation of the incremental speed of accelerated RSA decryption (with mathematical library) using the inventive algorithm with respect to key length.

Figure 6E:
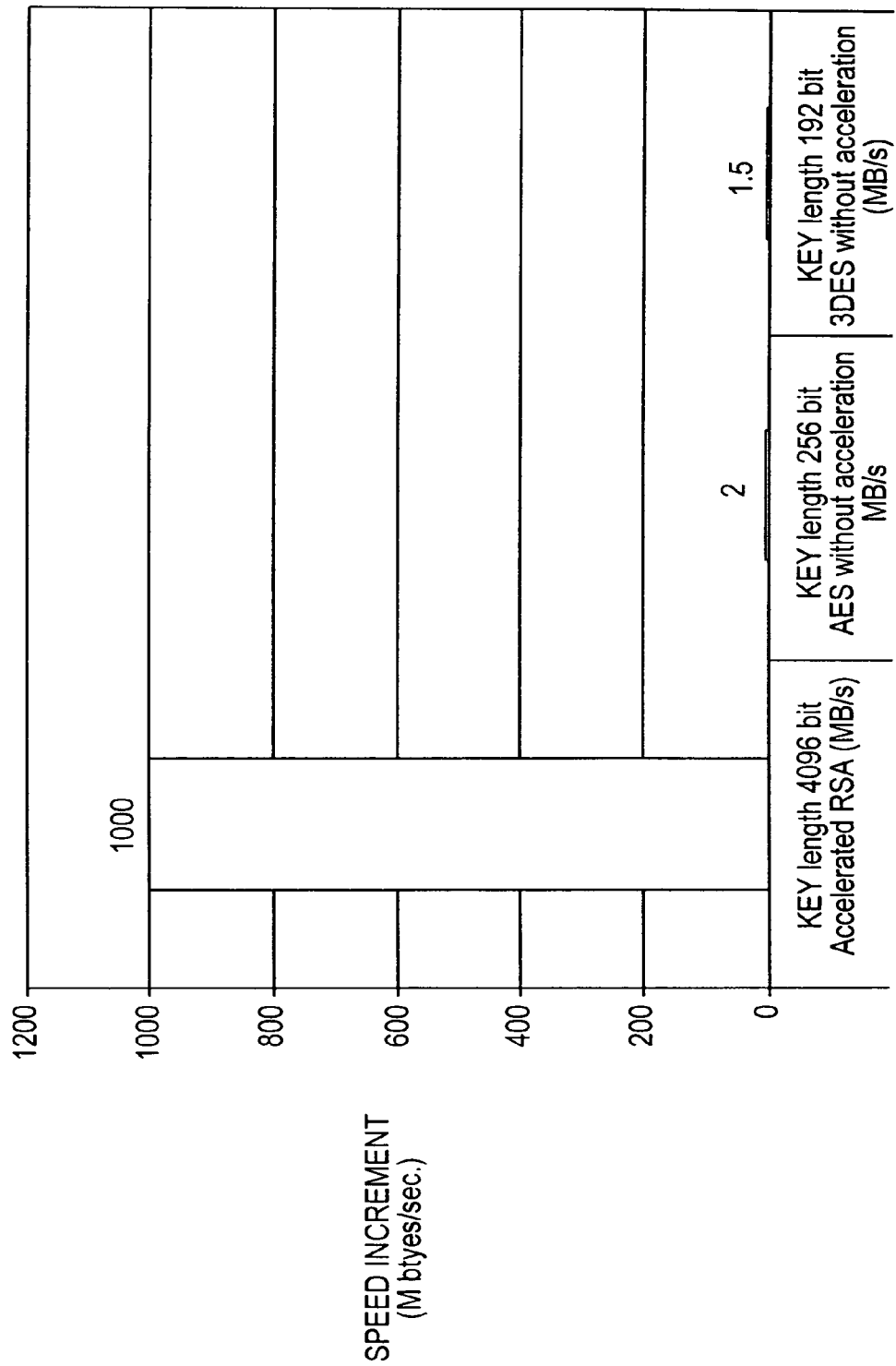

FIG. 6e is a graphical representation of the incremental speed of accelerated RSA encryption using the inventive algorithm and AES and 3DES (industry standards).

As indicated earlier, the algorithm according to the present invention also has application with respect to video compression, audio compression, OCR, digital photography zooming applications, and motion detection and compression applications, among other applications. Below is an illustrative example of use of the inventive algorithm to accelerate the speed of video compression.

Figure 7A:
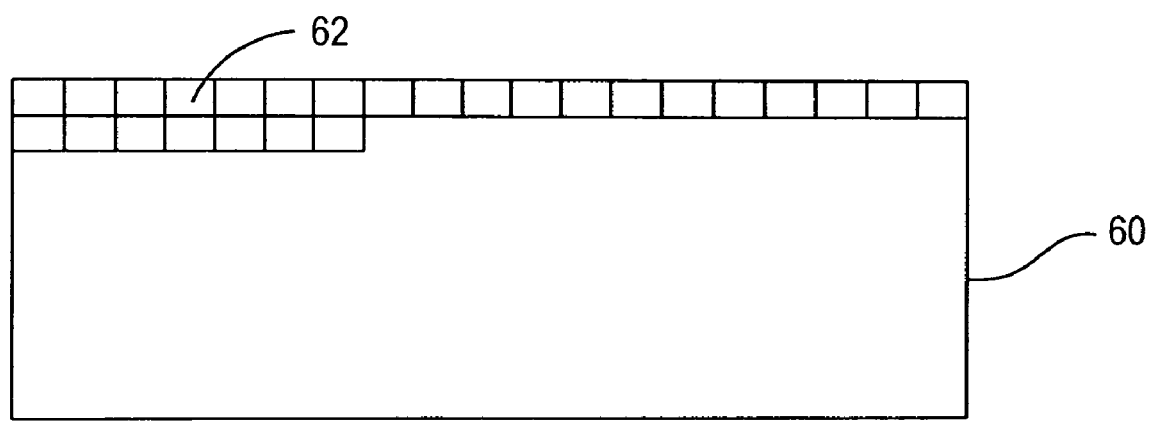

Referring to FIGS. 7a and 7b, a frame 60 from a single picture from a video is obtained (uncompressed data, see step 64) and divided into fragments 62 (step 66) which are inscribed into a data structure STB1 (k1, k2, k3 . . . ki, ki+1, . . . kn) (step 68). Each fragment is assigned to variable f; the fragments' positions are inscribed into a data structure STB2 (L1, L2, L3 . . . Li, Li+1, . . . Ln) as variable g (step 70).

While data are gathered, the following operation is performed:

$$k1 \lor k2 \lor \ldots kn = ?f \text{ and } g = g+1$$

where "=?" denotes an operation of comparison resulting in either of two outputs:
a) TRUE or FALSE and h
or
b) number If the output returns TRUE for ki and f; then STB2 Li is assigned value h which consists of the first value n appearing as TRUE. If TRUE, the next frame's fragment is taken.

In the case where the value FALSE is returned for k1, k2, k3 . . . kn and kn still returns FALSE, then STB2 L(n+1) is assigned value h, which, in that case, equals n+1. At the same time, STB1 is assigned k(n+1) value f.

The "number" in b) above indicates the difference between the values in STB1, where, depending on the degree of comparison, the procedures described above can be followed.

The consecutive frame is then read, and the process starts from the beginning.

After reading all of the frames, the data from STB1 and STB2 are collected and written into a separate file (step 72), marking the end of the video compression acceleration process using the inventive algorithm.

Referring to FIG. 7c, for decompression of compressed video data (see step 74), the files which consist of STB1 and STB2 are read (steps 76 and 78), and the values from STB1 that are represented by the numbers from STB2 ki, where i each time equals the value i+1, are presented. The frame fragments, when connected (step 80), form a visual output (step 82).

An embodiment of a technique for accelerating the speed of video compression according to the present invention can be effected in accordance with the following general logic:

---

1) i = 1
2) j = 1
3) assign dimension of each frame fragment
4) if value of i is greater than the last frame, then go to 15)
5) read frame i
6) if value of j is greater than the last frame's fragment, then go to 13)
7) read fragment's frame j
8) check if STB1 has frame fragment j; if yes, then go to 10) and assign into k the number of frame fragment from STB1
9) assign frame fragment into STB1 and assign into k the number of the last element of STB1
10) assign into STB2 the number of frame fragment k
11) j = j+1
12) go to 6)
13) i = i+1
14) go to 4)
15) end

---

Figure 7D:
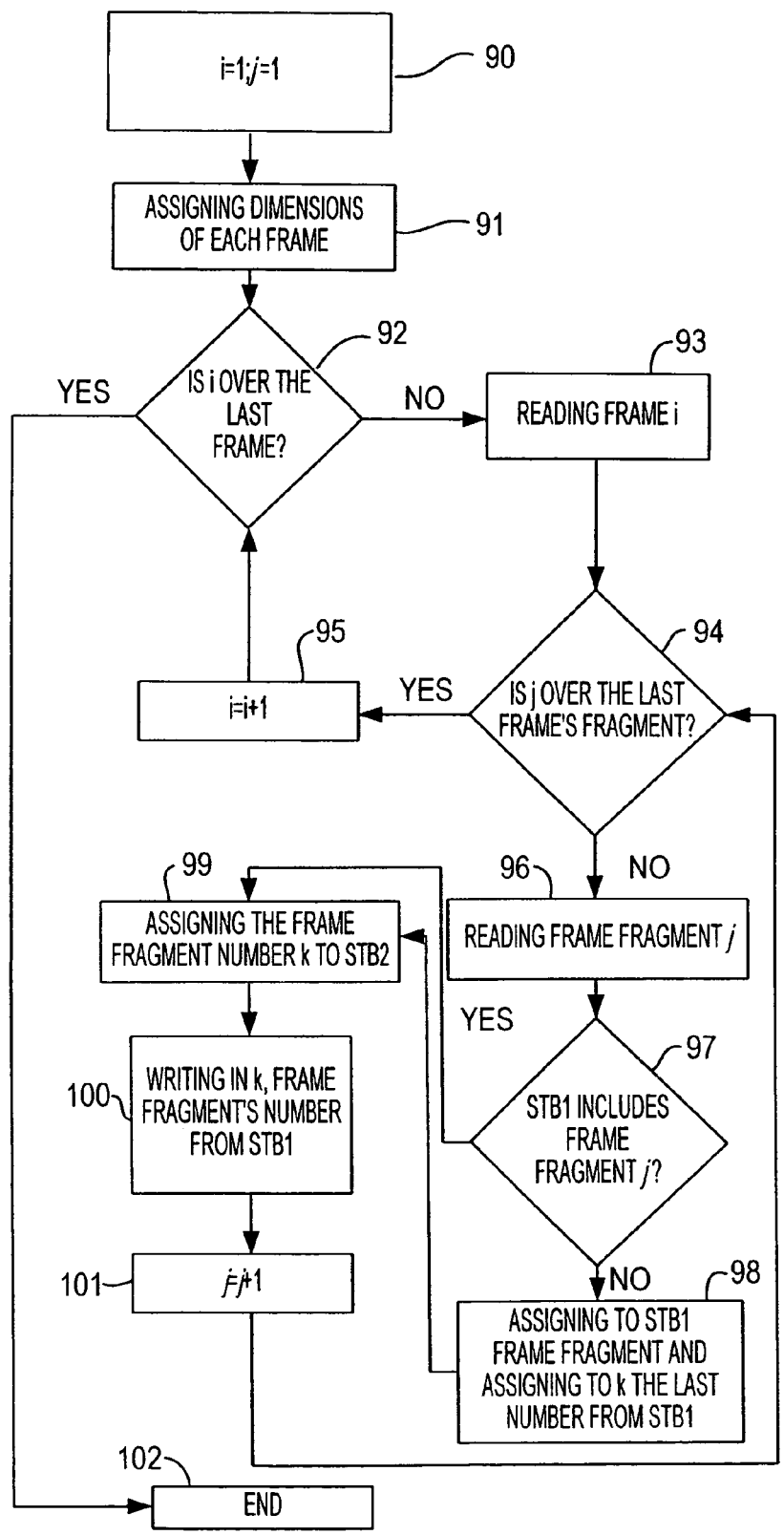

With reference to FIG. 7d (illustrating the acceleration of video compression utilizing the algorithm according to an embodiment of the present invention), at step 90, variable i, representing a frame of a picture, and variable j, representing a fragment of the frame, are each set equal to 1. At step 91, the dimensions of each frame are assigned. At step 92, the inventive algorithm determines whether i is beyond the last frame—if it is, the acceleration process ends (step 102); if it is not, the process proceeds to step 93 where frame i is read. Thereafter, the inventive algorithm determines if j is beyond the last frame's fragment (step 94)—if it is, i is incremented at step 95 (i=i+1) and step 92 is revisited; if it is not, the process proceeds to step 96 where fragment j is read. At step 97, the inventive algorithm determines if STB1 includes fragment j—if it does not, the process proceeds to step 98 where the frame fragment is assigned to STB1 and the last number from STB1 is assigned to k, if it does include fragment j, the process skips step 98 and proceeds to step 99 where the frame fragment number k is assigned to STB2. At step 100, the frame fragment's number from STB1 is written into k. At step 101, j is incremented (i=j+1), and the process revisits step 94.

An embodiment of a technique for accelerating the speed of video decompression according to the present invention can be effected in accordance with the following general logic:

```
1) i=1
2) assign dimension of each frame fragment
3) if i is a frame fragment number in STB2 that is greater than
   the number of elements, then go to 10)
4) read the number of the element i from STB2 and assign its
   value into L
5) read frame fragment from STB1 with the assigned number L
   and assign it into k
6) fragment k appears on the screen
7) i = i+1
8) if the screen (frame) is filled, then algorithm removes
   content and starts from the beginning
9) go to 3)
10) end
```

Figure 7E:
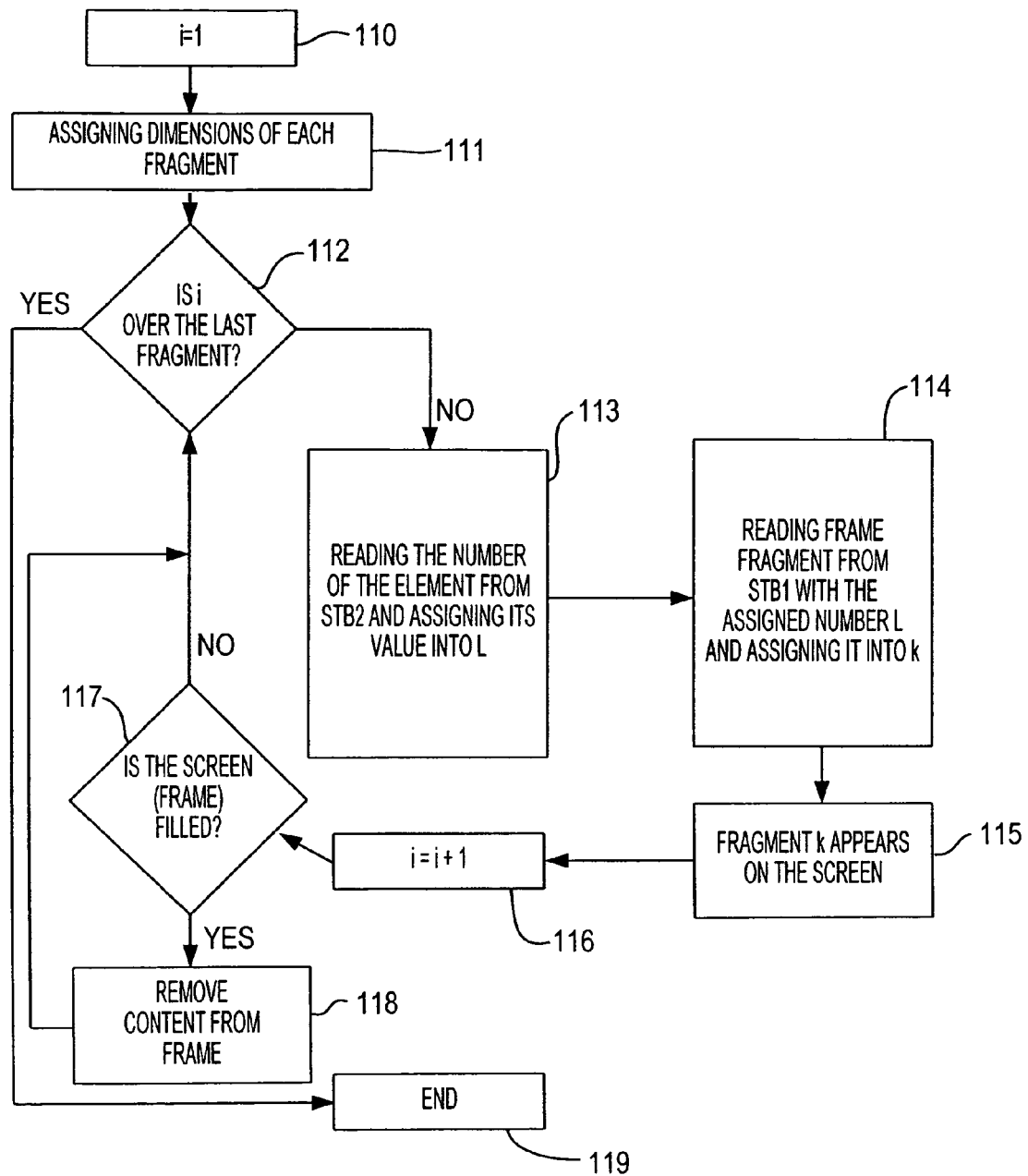

With reference to FIG. 7*e*, (illustrating the acceleration of video decompression utilizing the algorithm according to an embodiment of the present invention), at step 110, variable i, now representing a fragment of the frame, is set equal to 1. At step 111, the dimensions of each frame fragment are assigned. At step 112, the inventive algorithm determines whether i is beyond the last frame fragment—if it is, the acceleration process ends (step 119); if it is not, the process proceeds to step 113 where the number of the element from STB2 is read and its value assigned into L. Thereafter, at step 114, the inventive algorithm reads the frame fragment from STB1 with the assigned number L and assigns it into k. At step 115, the fragment k is visually presented, and, at step 116, i is incremented (i=i+1). At step 117, the algorithm determines whether the frame is filled—if it is, its contents are removed (step 118) and the process revisits step 112; if it is not filled, the process skips step 118 and revisits step 112.

The following is an illustrative example of video compression (of the below frame consisting of five fragments K1, K2, K3, K4, K5) utilizing the inventive algorithm in accordance with one embodiment of the present invention:

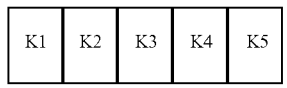

At this point both STB1 and STB2 hold no information. First fragment K1 is assigned into variable f and compared against STB1.

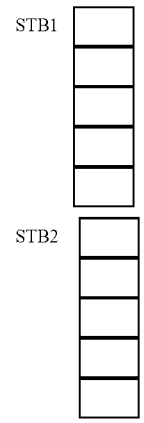

The first element in STB1 is empty, so a FALSE indication is returned, and K1 is entered into STB1 and the first element in STB2 is filled with the number "1" (representing the position of fragment K1 in STB1).

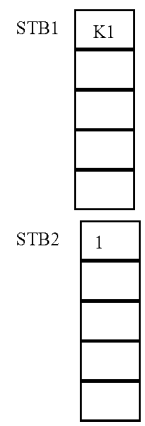

The next fragment K2 is assigned into f and compared against STB1. Since K2 is different from K1, a FALSE is indicated, and K2 is entered into SB1 and the second element in STB2 gets number "2."

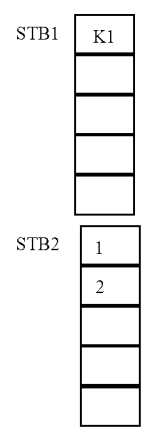

The next fragment K3 is assigned into f and compared against STB1. The comparison starts with the first element in STB1, then the second, third and so on. Since K3 is different from K1 and from K2, a FALSE is indicated, and K3 is entered into STB1 and the third element in STB2 gets number "3."

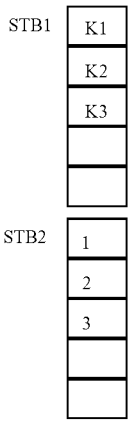

K4 is assigned into f and compared against STB1. This time: K4 is different from K1 and K4 is the same as K2. Accordingly, a TRUE is indicated and, at this point, the algorithm stops, STB1 gets nothing and the forth element in STB2 gets number "2."

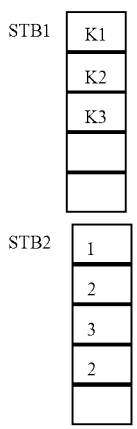

K5 is assigned into f and compared against STB1. This time: K5 is different from K1, K5 is different from K2 and K5 is different from K3. As the next element is empty, a FALSE is indicated. At this point, the fourth element in STB1 gets K5 and the fifth element in STB2 gets number "4."

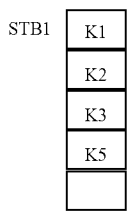

-continued

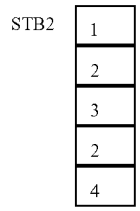

When the last frame is entered, data from STB1 and STB 2 are written into a file.

Additionally, after the accelerated compression process illustrated above is completed, all fragments from STB1 can be taken and combined into another picture. This picture can then be divided into fragments and the accelerated compression process run again from the beginning yielding STB3 and STB4 (not shown). It should be appreciated that this additional accelerated compression can realize improved compression results (which may be 50% better).

As an illustrative example of video decompression (of the above compressed file) utilizing the inventive algorithm, STB1 and STB2 are retrieved from the compressed file. The number in the first element of STB2 indicates which fragment of a frame will be displayed as first. The first element of STB2 indicates the first element in STB1, i.e., K1; the second element of STB2 indicates the second element in STB1, i.e., K2; the third element of STB2 indicates the third element in STB1, i.e., K3; the fourth element of STB2 indicates the second element in STB1, i.e., K2 (K4=K2); and the fifth element of STB2 indicates the fourth element in STB1, i.e., K5.

Figure 7F:
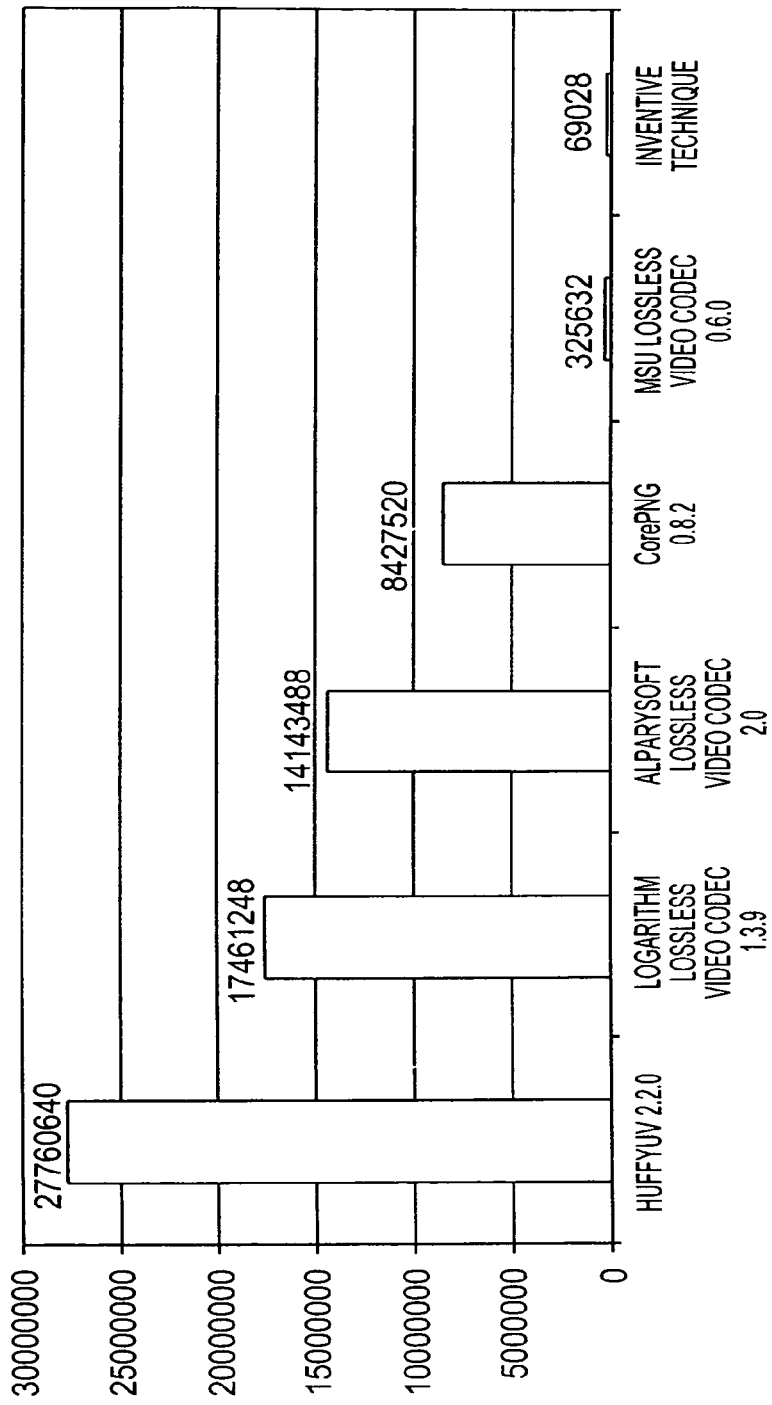
Figure 7G:
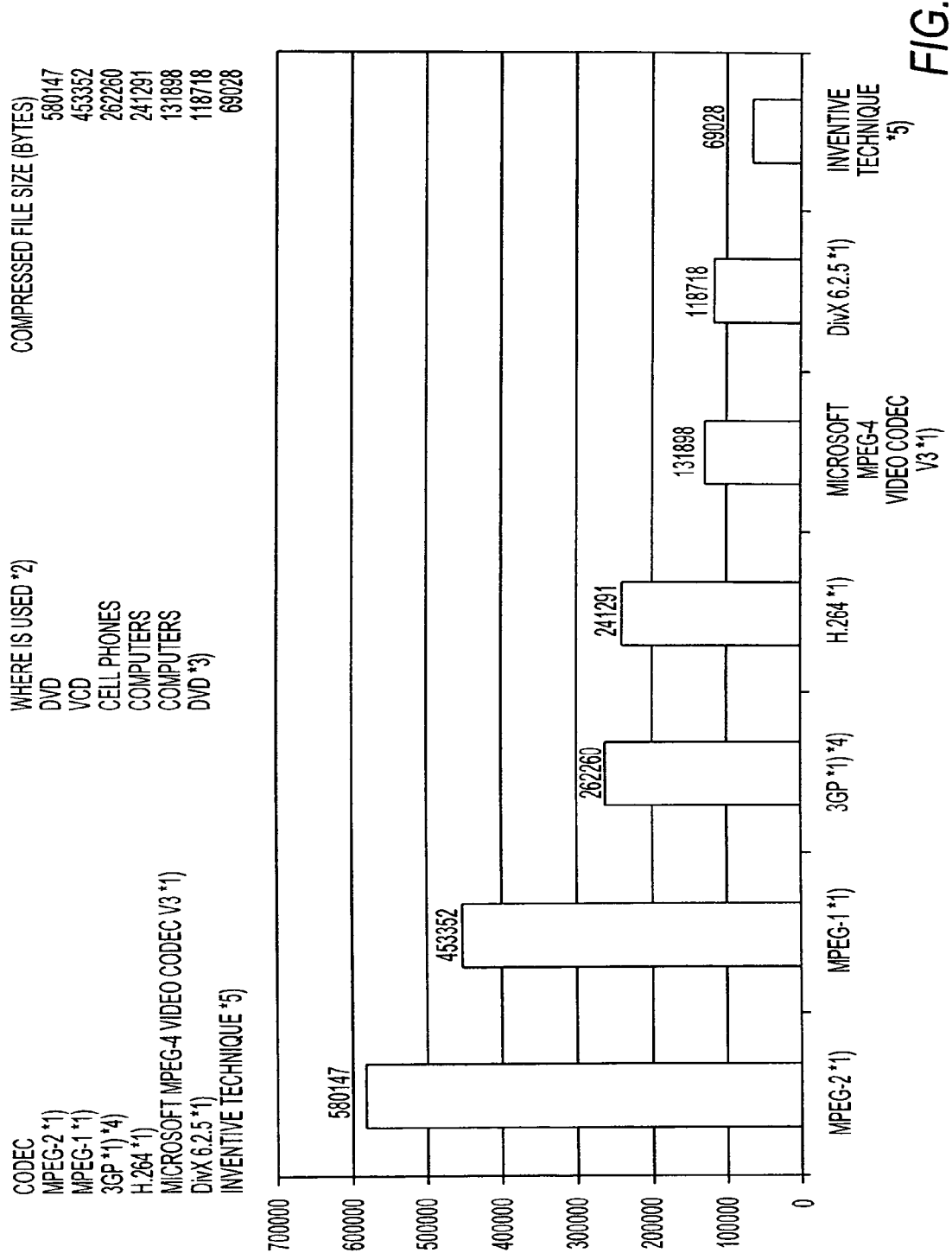

FIGS. 7f and 7g set forth test results (in graphical form) illustrating the advantageous acceleration (lossless) capabilities of the inventive algorithm in video compression applications. Testing was conducted on a video file having the following parameters:

640×480 resolution
24 bit color
15 frames/sec
197,227,768 bytes—file size before compression More particularly, FIG. 7f is a comparison of the inventive technique (lossless) against lossless codecs; FIG. 7g is a comparison of the inventive technique (lossless) against lossy compression codecs. With respect to FIG. 7g: *1) signifies that the lossless codec's bit rate was set up so that motion would be visible and the result file had the highest possible compression ratio (visual quality degraded compared to the source file); *2) denotes application of codecs in different areas (all compressed files viewable on computer); *3) indicates that the compression format can be used with DVD players; *4) denotes 3GP MPEG-4; and *5) indicates that the result file was compressed with a lossless compression method.

As indicated earlier, the algorithm according to the present invention also has application with respect to audio compression, OCR, digital photography zooming applications, and motion detection and compression applications, among other applications. Below is an illustrative example of use of the inventive algorithm to accelerate the speed of audio compression.

Figure 8A:
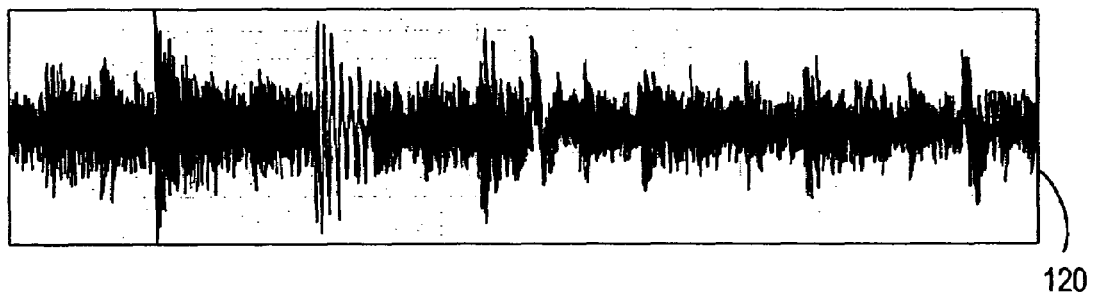
FIGS. 8a-8f illustrate acceleration of the speed of audio compression/decompression utilizing the inventive algorithm in accordance with an alternative embodiment of the present invention.
Figure 8B:
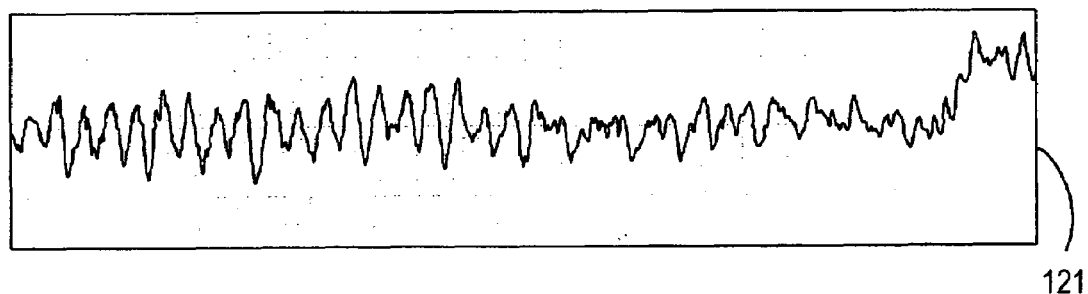
Figure 8C:
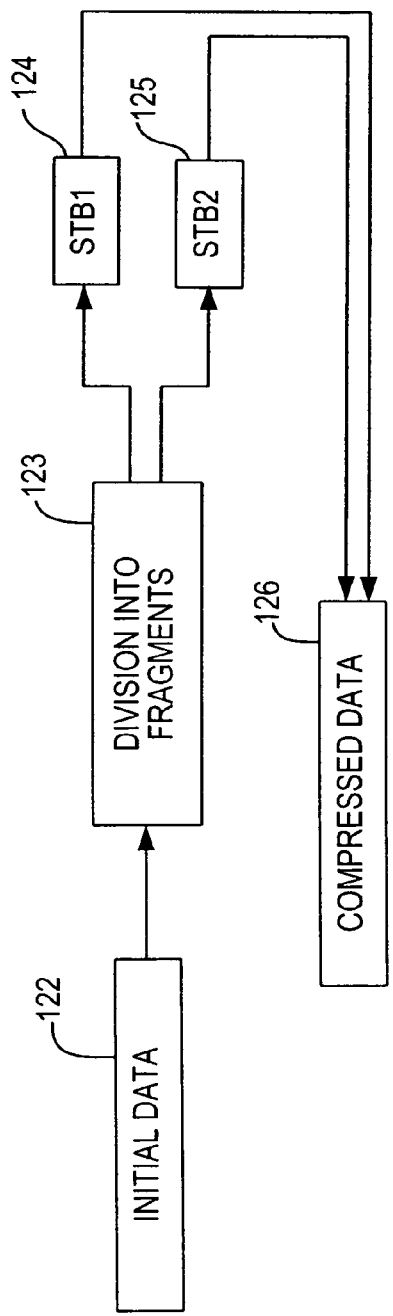

Referring now to the drawing figures, a sound wave 120 (FIG. 8a; FIG. 8c, step 122 (uncompressed)) is divided into fragments 121 (FIG. 8b; FIG. 8c, step 123) which are inscribed into SBT1 (k1, k2, k3 . . . ki, ki+1, . . . kn) (FIG. 8c, step 124). Each fragment 121 is assigned to a variable f; the fragments' positions are inscribed in STB2 (L1, L2, L3 . . . Li, Li+1, . . . Ln) as variable g (FIG. 8c, step 125).

While data are gathered, the following operation is performed:

$$k1 \lor k2 \lor \ldots kn = ?f \text{ and } g = g+1$$

where "=?" denotes an operation of comparison resulting in either of two outputs:
a) TRUE or FALSE and h
or
c) number If the output returns TRUE for ki and f; then STB2 Li is assigned value h which consists of the first value n appearing as TRUE. If TRUE, the next fragment is taken.

In the case where the value FALSE is returned for k1, k2, k3 . . . kn and kn still returns FALSE, then STB2 L(n+1) is assigned value h, which, in that case, equals n+1. At the same time, STB1 is assigned k(n+1) value f.

The "number" in b) above indicates the difference between the values in STB1, where, depending on the degree of comparison, the procedures described above can be followed.

After reading all of the fragments, the data from STB1 and STB2 are collected and written into a separate file (step 126), marking the end of the audio compression acceleration process using the inventive algorithm.

Figure 8D:
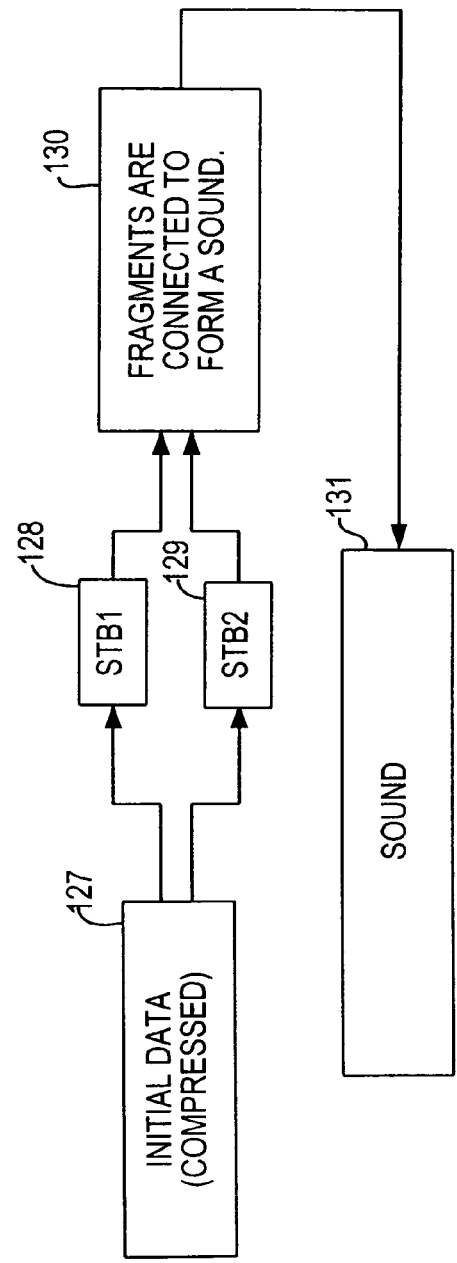

Referring to FIG. 8d, for decompression of compressed audio data (see step 127), the files which consist of STB1 and STB2 are read (steps 128 and 129), and the values from STB1 that are represented by the numbers from STB2 ki, where i each time equals the value i+1, are presented. The fragments, when connected (step 130), form a sound (step 131).

Figure 8E:
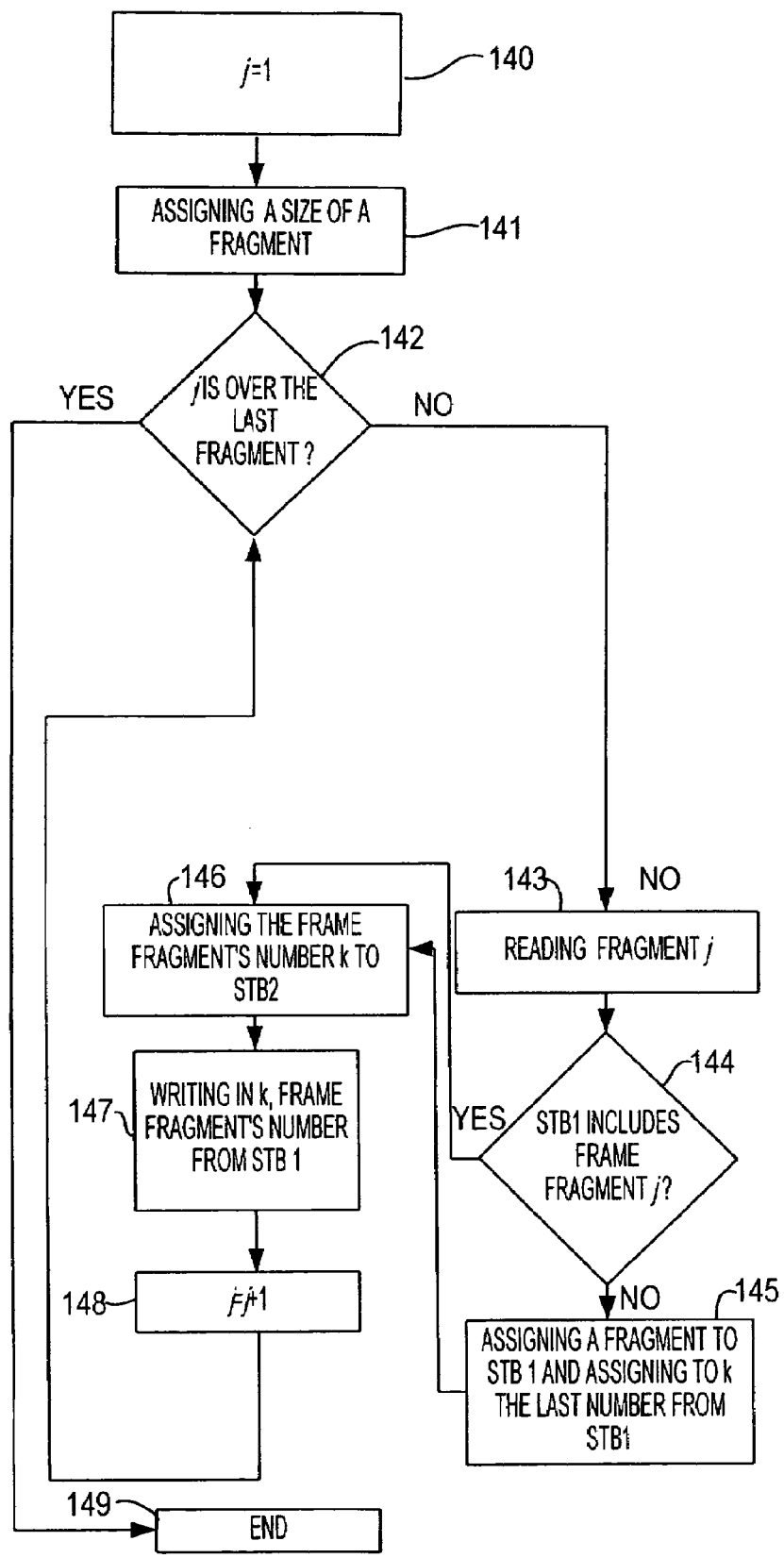

An embodiment of a technique for accelerating the speed of audio compression according to the present invention can be effected in accordance with the following general logic:

1) j = 1
2) assign a size of each fragment (one fragment indicates the size of a cut-out of the sound wave)
3) if value of j is greater than the last fragment, then go to 10)
4) read fragment j
5) check if STB1 has fragment j; if the answer is yes, then go to 7) and assign into k the number of fragment from STB1
6) assign fragment into STB1 and assign into k the number of the last element of STB1
7) assign into STB2 the number of fragment k
8) j = j+1
9) go to 3)
10) end With reference to FIG. 8e (illustrating the acceleration of audio compression utilizing the algorithm according to an embodiment of the present invention), at step 140, variable j, representing a sound wave fragment, is set equal to 1. At step 141, the size of the fragment is assigned. At step 142, the inventive algorithm determines whether j is beyond the last fragment—if it is, the acceleration process ends (step 149); if it is not, the process proceeds to step 143 where fragment j is read. At step 144, the inventive algorithm determines if STB1 includes fragment j—if it does not, the process proceeds to step 145 where the fragment is assigned to STB1 and the last number from STB1 is assigned to k; if it does include fragment j, the process skips step 145 and proceeds to step 146 where the fragment number k is assigned to STB2. At step 147, the fragment's number from STB1 is written into k. At step 148, j is incremented (j=j+1), and the process revisits step 142.

Figure 8F:
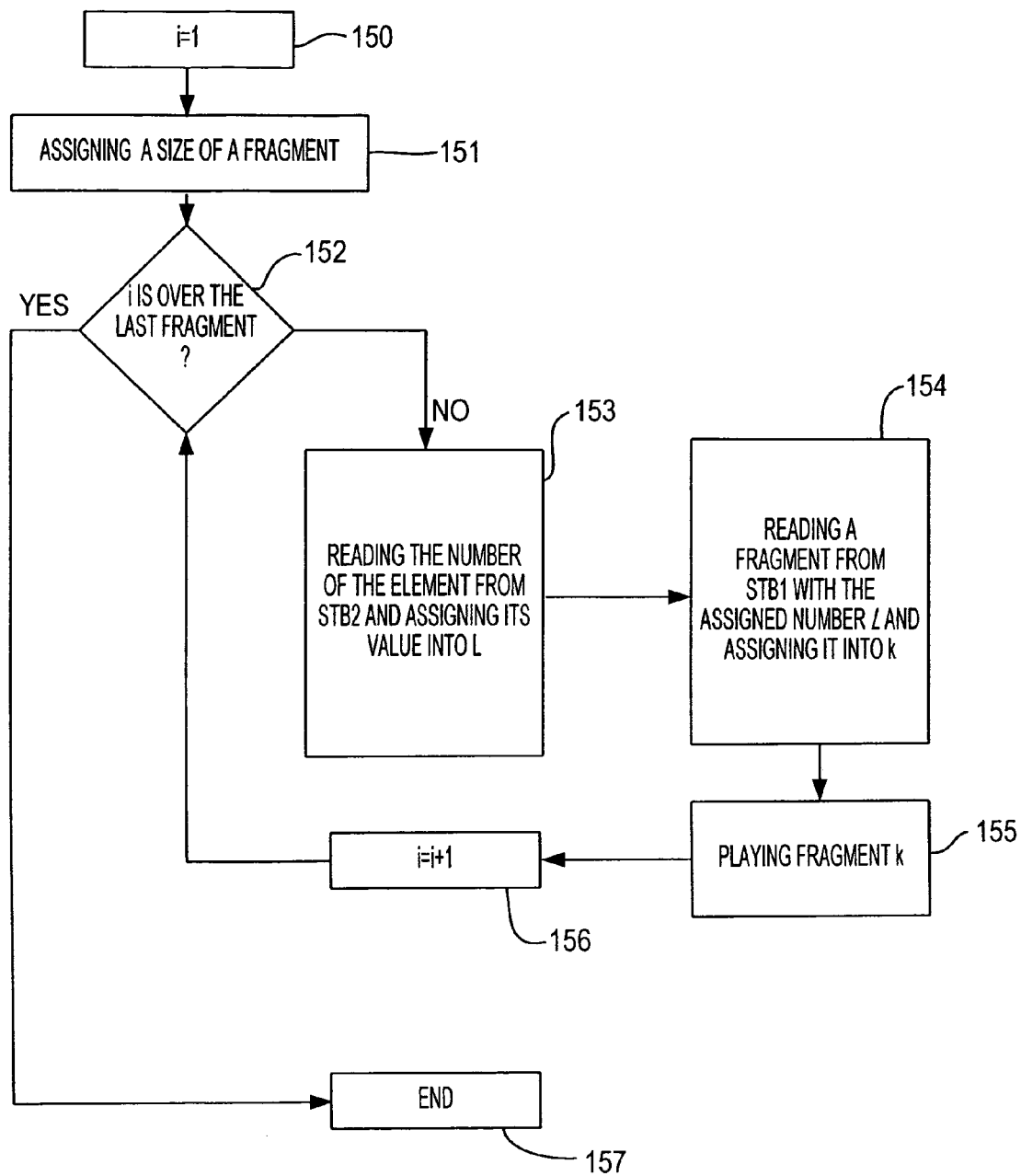

An embodiment of a technique for accelerating the speed of audio decompression according to the present invention can be effected in accordance with the following general logic:

1) i=1
2) assign a size of one fragment
3) if i is a fragment's number in STB2 that is greater than the number of elements, then go to 9)
4) reading the number of the element i from STB2 and assign its value into L
5) read fragment from STB1 with the assigned number L and assign it into k
6) play fragment k
7) i=i+1
8) go to 3)
9) end With reference to FIG. 8f, (illustrating the acceleration of audio decompression utilizing the algorithm according to an embodiment of the present invention), at step 150, variable i, now representing a sound wave fragment, is set equal to 1. At step 151, the dimensions of the fragment are assigned. At step 152, the inventive algorithm determines whether i is beyond the last fragment—if it is, the acceleration process ends (step 157); if it is not, the process proceeds to step 153 where the number of the element from STB2 is read and its value assigned into L. Thereafter, at step 154, the inventive algorithm reads the fragment from STB1 with the assigned number L and assigns it into k. At step 155, the fragment k is audibly presented. At step 156, i is incremented (i=i+1), and the process revisits step 152.

The following is an illustrative example of audio compression (of a sound wave consisting of five fragments K1, K2, K3, K4, K5) utilizing the inventive algorithm in accordance with one embodiment of the present invention:

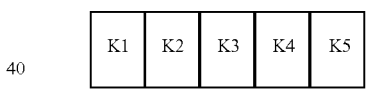

At this point both STB1 and STB2 hold no information. First fragment K1 is assigned into variable f and compared against STB1.

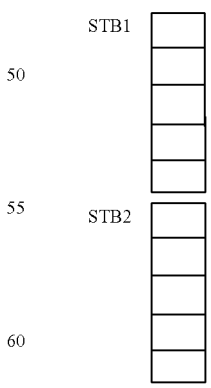

The first element in STB1 is empty, so a FALSE indication is returned, and K1 is entered into STB1 and the first element in STB2 is filled with the number "1" (representing the position of fragment K1 in STB1).

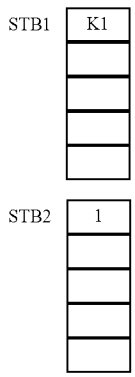

The next fragment K2 is assigned into f and compared against STB1. Since K2 is different from K1, a FALSE is indicated, and K2 is entered into STB1 and the second element in STB2 gets number "2."

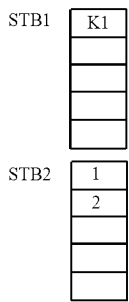

The next fragment K3 is assigned into f and compared against STB1. The comparison starts with the first element in STB1, then the second, third and so on. Since K3 is different from K1 and from K2, a FALSE is indicated, and K3 is entered into STB1 and the third element in STB2 gets number "3."

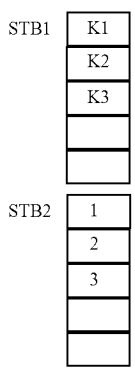

K4 is assigned into f and compared against STB1. This time: K4 is different from K1 and K4 is the same as K2. Accordingly, a TRUE is indicated and, at this point, the algorithm stops, STB1 gets nothing, and the forth element in STB2 gets number "2."

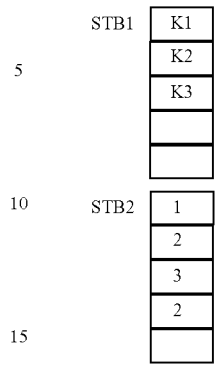

K5 is assigned into f and compared against STB1. This time: K5 is different from K1, K5 is different from K2 and K5 is different from K3. As the next element is empty, a FALSE is indicated. At this point, the fourth element in STB1 gets K5 and the fifth element in STB2 gets number "4."

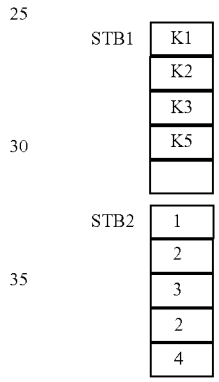

When the last fragment is entered, data from STB1 and STB 2 are written into a file.

As an illustrative example of audio decompression (of the above compressed file) utilizing the inventive algorithm, STB1 and STB2 are retrieved from the compressed file. The number in the first element of STB2 indicates which fragment will be played as first. The first element of STB2 indicates the first element in STB1, i.e., K1; the second element of STB2 indicates the second element in STB1, i.e., K2; the third element of STB2 indicates the third element in STB1, i.e., K3; the fourth element of STB2 indicates the second element in STB1, i.e., K2 (K4=K2); and the fifth element of STB2 indicates the fourth element in STB1, i.e., K5.

As indicated earlier, the algorithm according to the present invention also has application with respect to OCR, digital photography zooming applications, and motion detection and compression applications, among other applications. Below is an illustrative example of use of the inventive algorithm to accelerate the speed of OCR.

Figure 9A:
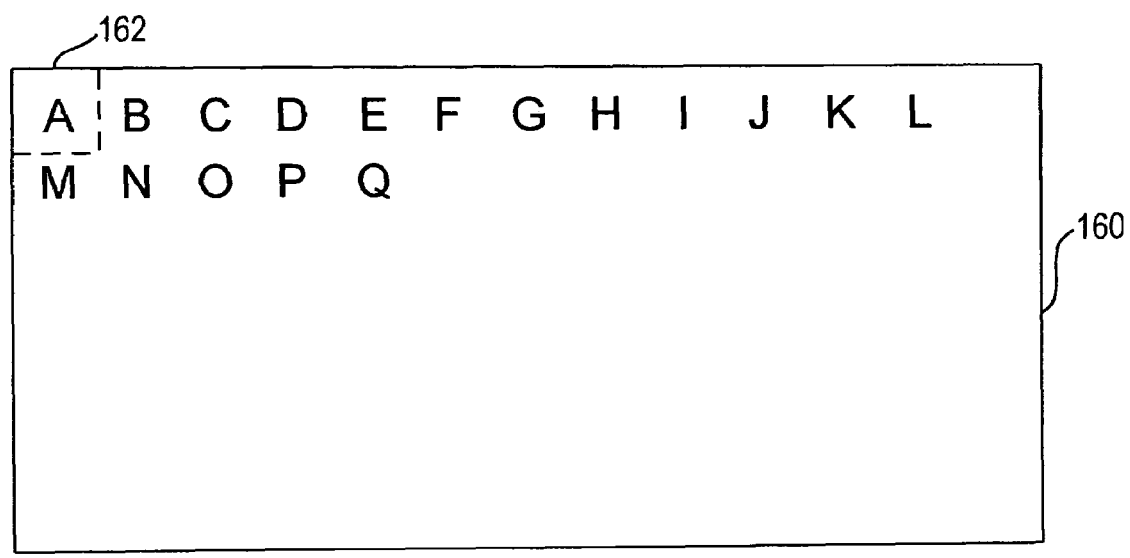
FIGS. 9a-9c illustrate acceleration of the speed of OCR utilizing the inventive algorithm in accordance with an alternative embodiment of the present invention.
Figure 9B:
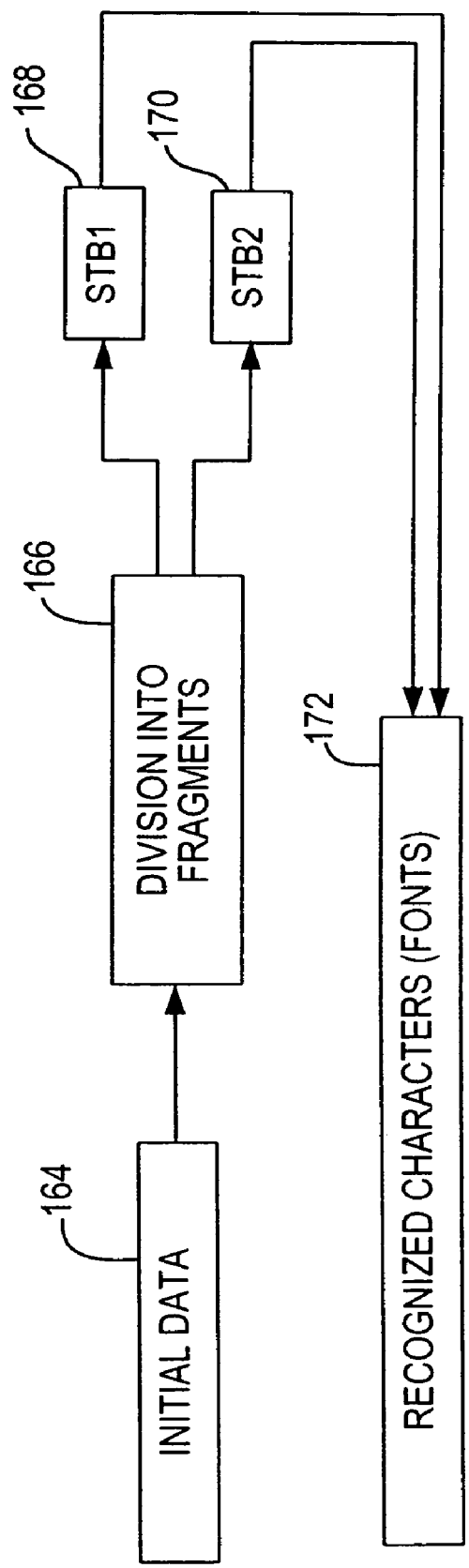

Referring now to FIG. 9a, a single picture 160 from a page of text is obtained (see step 164) and divided into fragments 162 (step 166) which are inscribed into a data structure STB1 (k1, k2, k3 ... ki, ki+1, ... kn) (step 168). Each fragment is assigned to variable f; the fragments' positions are inscribed into a data structure STB2 (L1, L2, L3 ... Li, Li+1, ... Ln) as variable g (step 170).

While data are gathered, the following operation is performed:

$$k1 \lor k2 \lor \ldots kn = ?f$$

and $$g = g+1$$

(only when $k1 \lor k2 \lor \ldots kn=?f$ results in FALSE; in the event comparison results in TRUE, a variable m points to a position of k for which this relationship is TRUE)

where "=?" denotes an operation of comparison resulting in the following outputs: TRUE or FALSE and h If the output returns TRUE, the inventive algorithm ceases operation and a value with a position m is taken from STB2 and returned as a character.

In the case where FALSE is returned, then a matrix *1 (a structure in which a character(s) is(are) written) is inserted into STB1 in the position (n+1), and a recognized character is inserted into STB2 in a position (n+1). Consecutive operations of the inventive algorithm are the same as in the case where the comparison resulted in TRUE.

"h" above is the recognized character which is always returned regardless of whether TRUE or FALSE is indicated.

Fragments are taken one-at-a-time (the process running from beginning to end for each) until all characters are recognized.

After reading all of the fragments, the data from STB1 and STB2 are collected and written into a separate file (step 172), marking the end of the OCR acceleration process using the inventive algorithm.

An embodiment of a technique for accelerating the speed of OCR (on separate fragments that are written into a file which consists of a picture) according to the present invention can be effected in accordance with the following general logic:

---

1) i = 1
2) assign a size of a fragment (one fragment indicates the size of a cut-out of the picture/page; the size of a fragment in this example depends on font size)
3) if there is nothing else to recognize go to 13)
4) assign fragment i into k (k may be a variable or may be a structure consisting of a fragment or just a variable consisting of CRC or Hash or something different to distinguish certain elements from each other)
5) check if STB1 has k; if the answer is YES, assign position from STB1 into variable f, then go to 10)
6) recognize k as a font and assign it into L
7) assign into STB1 structure k on the position (n+1)
8) assign into STB2 the recognized character L on the position (n+1)
9) go to 11)
10) take from STB2 the font of the position from f and add it to a result file, screen, etc.
11) i = i+1
12) go to 3)
13) end

---

It should be appreciated that the description of STB1 and STB2 is the same as in the encryption case discussed earlier. It also includes numbers, but in this case, those numbers represent the picture or recognized characters (fonts).

Figure 9C:
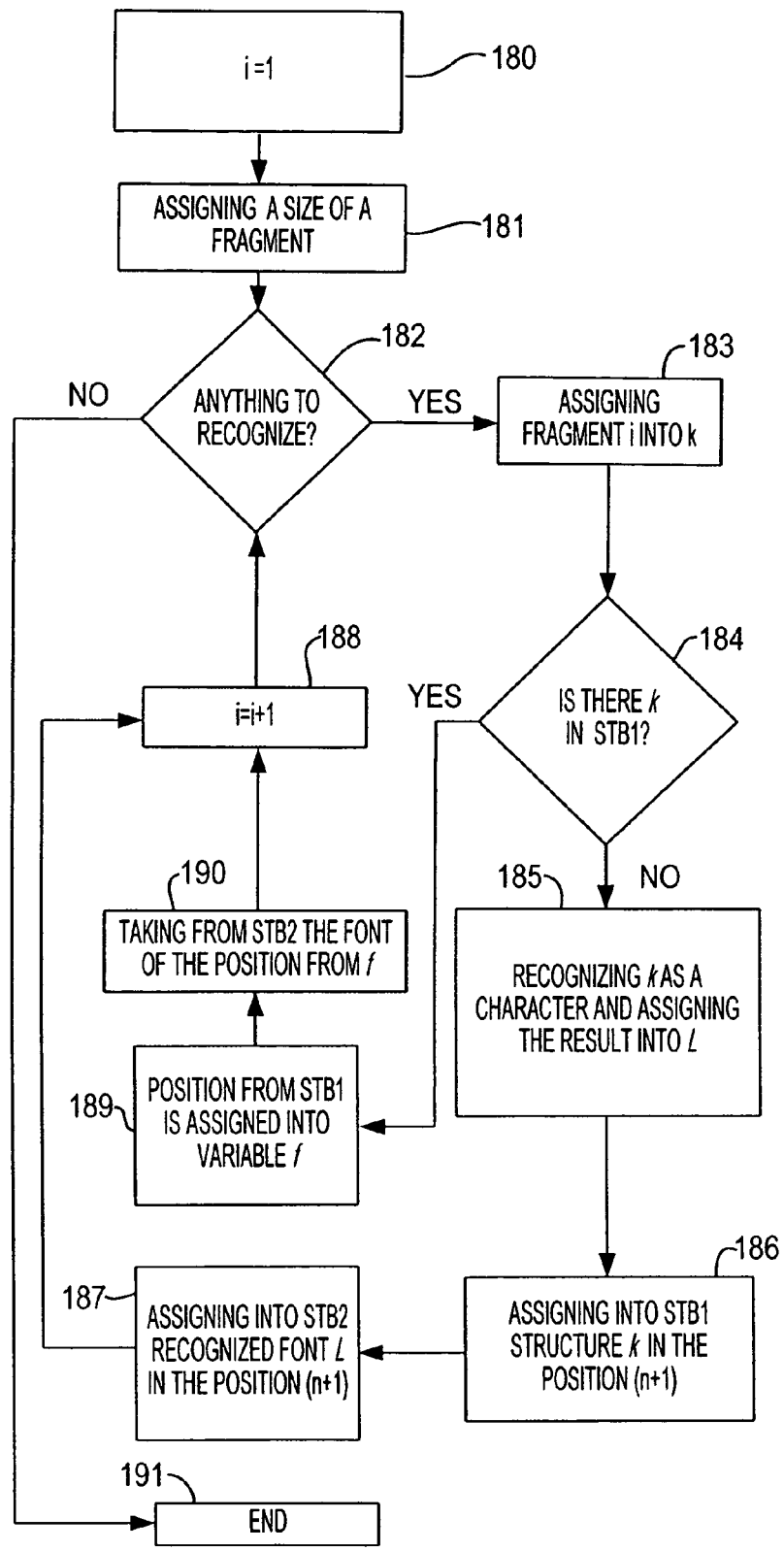

With reference to FIG. 9c (illustrating the acceleration of OCR utilizing the algorithm according to the present invention), at step 180, variable i, representing a fragment of a picture, is set equal to 1. At step 181, the size of each fragment is assigned. At step 182, the inventive algorithm determines whether there is anything to recognize—if there is not, the acceleration process ends (step 191); if there is something to recognize, the process proceeds to step 183 where fragment i is assigned into k. Thereafter, the inventive algorithm determines if k is in STB1 (step 184)—if it is not, k is recognized as a character and assigned into L (step 185), structure k is assigned into STB1 in the position (n+1) (step 186), recognized character L is assigned into STB2 in the position (n+1) (step 187), i is incremented at step 188 (i=i+1), and step 182 is revisited; if k is in STB1, the process proceeds to step 189 where the position from STB1 is assigned into variable f. Thereafter, in step 190, the character of position f is taken from STB2, and the process proceeds to step 188.

The following is an illustrative example of OCR (of the below picture consisting of four fragments A, R, A, s) utilizing the inventive algorithm in accordance with one embodiment of the present invention:

At this point both STB1 and STB2 hold no information. First fragment A is assigned into variable k and compared against STB1.

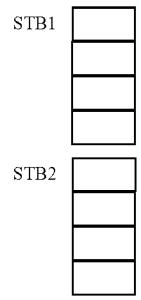

The first element in STB1 is empty, so a FALSE indication is returned, and A is entered into STB1 in the first position. A is also recognized as a character (font) and entered into STB2 in the first position (representing the position of fragment A in STB1). The recognized character (font) from STB2 may then be sent to a file (screen) that consists of recognized characters (fonts). If there is still something to recognize, the process moves to the next fragment.

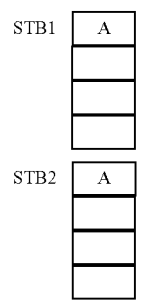

The next fragment R is assigned into k and compared against STB1. Since R is different from A, a FALSE is indicated, and R is entered into SB1 into the second position. R is also recognized as a character (font) and entered into STB2 in the second position. The recognized character (font) from STB2 may be sent to a file (screen) that consists of recognized characters (fonts). If there is still something to recognize, the process moves to the next fragment.

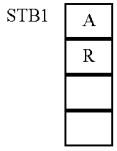

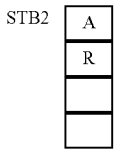

The next fragment A is assigned into k and compared against STB1. The comparison starts with the first element in STB1, then the second, and so on. Since A is the same as the entry in the first position of STB1, the comparison indicates TRUE, and nothing is assigned into STB1 or STB2.

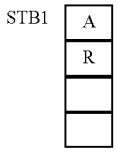

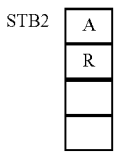

The first position in STB1, where the comparison resulted in TRUE, is assigned into variable f, which consists of the first position in STB1 which has already been recognized as a character (font) in the first position in STB2. The character (font) from the first position in STB2 may be added to the result file(screen).

The next fragment s is assigned into k and compared against STB1. The comparison starts with the first element in STB1, then the second, and so on. Since fragment s assigned into k is different than the entry in the first position in STB1, FALSE is indicated. Since fragment s assigned into k is also different than the entry in the second position in STB1, FALSE is again indicated. The next position being empty, FALSE is yet again indicated. Fragment s is assigned into STB1 in the third position, and the recognized character (font) is assigned into STB2 in the third position. Next, the recognized font from STB2 may be sent to a file (screen) that consists of recognized characters (fonts). There being nothing else to recognize, the process ends with the recognized text "ARAs."

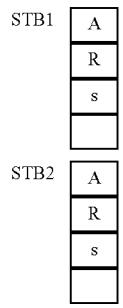

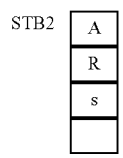

As indicated earlier, the algorithm according to the present invention also has application with respect to digital photography zooming applications, and motion detection and compression applications, among other applications. Below is an illustrative example of use of the inventive algorithm in connection with a digital photography zooming application.

Generally speaking, digital zoom involves increasing pixel size in an image. With increased pixel size, however, there is a concomitant loss of image quality. Sometimes, filters are employed which minimize the number of pixels causing the image to appear sharper with more detail.

Figure 10A:
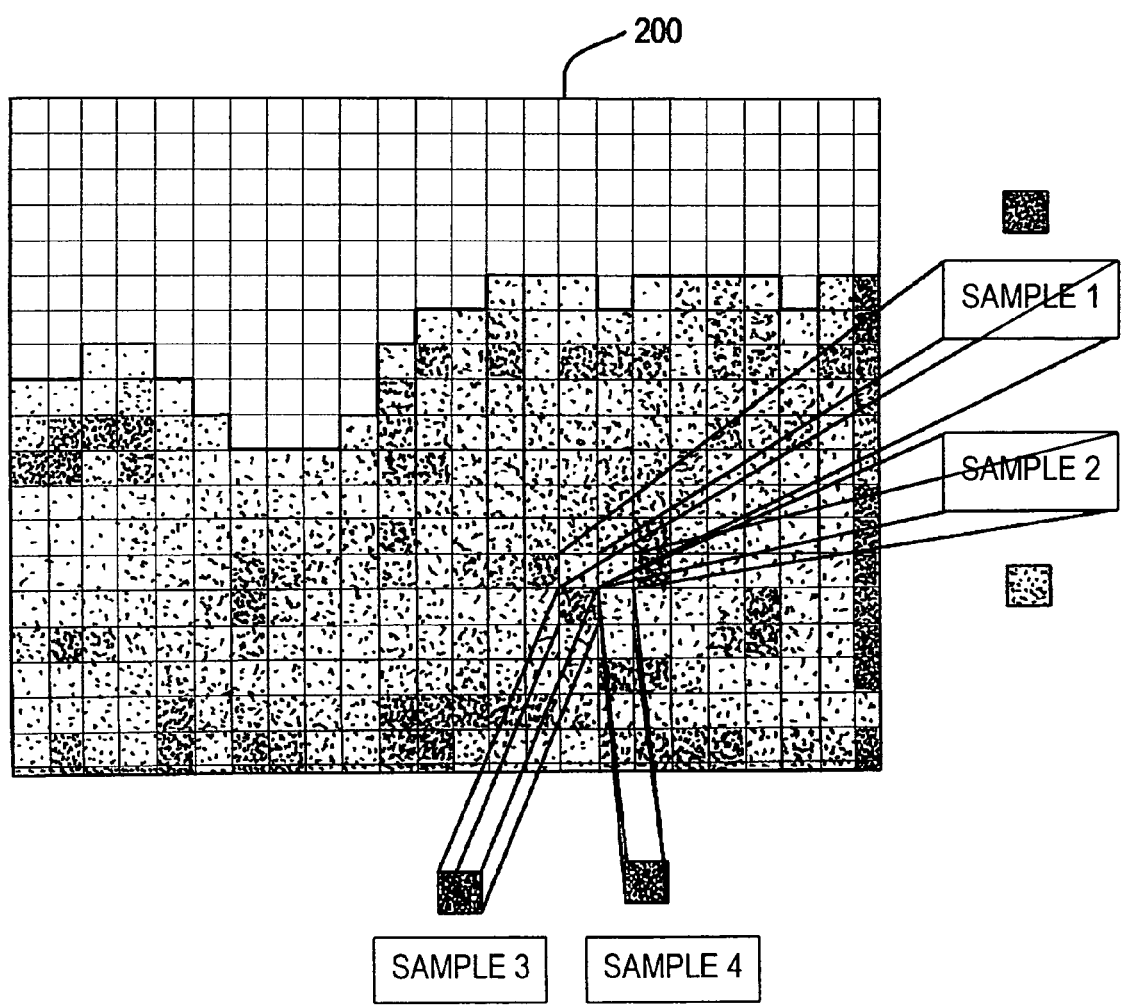
FIGS. 10a-10$c_{16}$ illustrate a digital photography zooming application utilizing the inventive algorithm in accordance with an alternative embodiment of the present invention.

Referring now to FIG. 10a, two samples (pixels) are taken from a zoomed digital image 200 in the cross-hairs of a digital camera (a picture has not yet been snapped). Desirably, the sample pixels are next to each other on the picture and have a noticeable color contrast (more samples may be used, but for purposes of this example only two are being used—namely, sample1 and sample2). Another two samples (i.e., sample3 and sample4) positioned next to each other are then taken.

Next, prior to snapping the picture, the distance required to execute a digital zoom (i.e., the distance between the subject object and the camera) is calculated by conventional means. Then, the light-sensitive matrix of the digital camera is moved horizontally across the image (that is, the fall of light rays is moved horizontally across the image). The movements are recorded on the camera's light-sensitive matrix. Each time a horizontal movement occurs, the consecutive pixels are written down to STB whereupon a picture is created in STB that has a higher resolution than the resolution of the matrix. A similar operation takes place for vertical movement across the image. The more movements of the matrix that take place (the more recognized pixels between samples) the greater the possibility for a higher resolution and a higher zoom factor.

Exposure may be performed as follows: at first, horizontal movements (along the X-axis of the digital image) from sample1 to sample2 take place; after that cycle is finished, the process starts again from sample1 moving vertically (along the Y-axis) until the last sample is reached.

The following is an example of an STB structure for digital zoom:

$$X = k1, k2, k3 \ldots ki, ki+1, \ldots kn$$

$$Y = L1, L2, L3 \ldots Li, Li+1, \ldots Ln$$

Figure 10B:
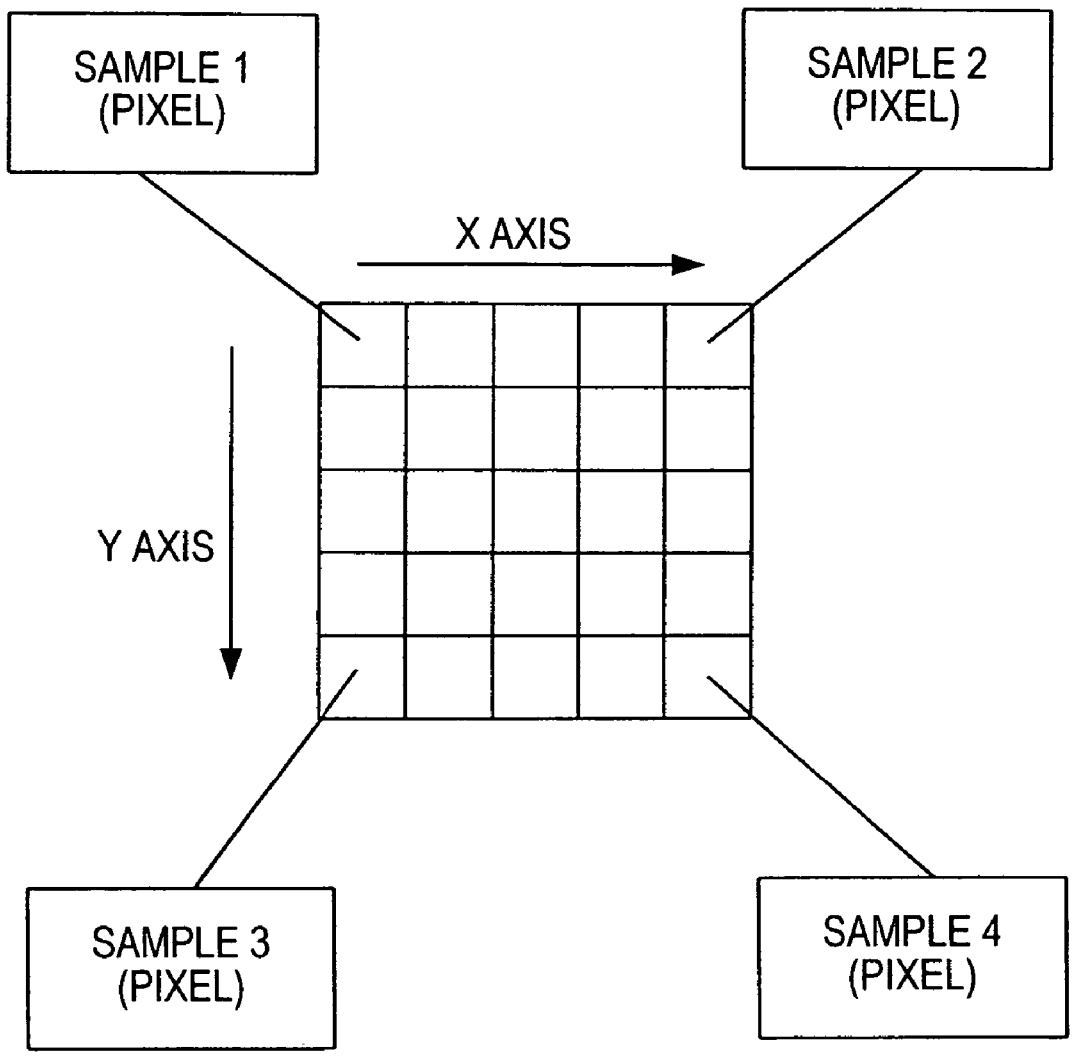
Figure 10C:
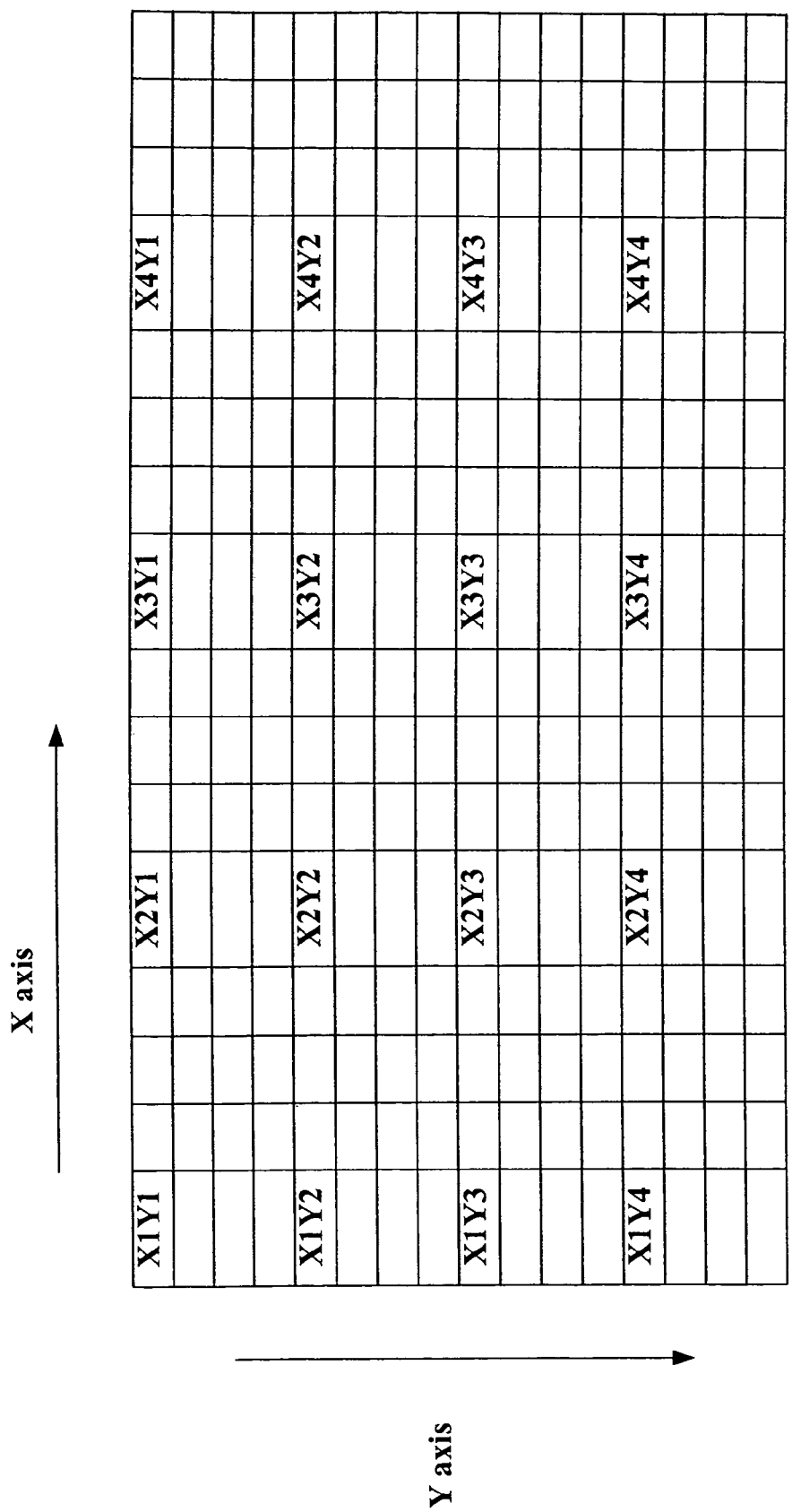

FIG. 10b shows the position of samples (pixels) in between which separate pixels are taken from a light sensitive matrix. Larger matrices consisting of many samples (pixels) can be used to achieve better results.

Referring now to FIGS. $10c_1$-$10c_{16}$ (where each added pixel is presented in bold text), as an additional example, a two-dimensional matrix is employed starting with sixteen pixels as the starting sample which are recorded on the camera matrix:

$X1Y1, X2Y1, X3Y1, X4Y1$ $X1Y2, X2Y2, X3Y2, X4Y2$ $X1Y3, X2Y3, X3Y3, X4Y3$ $X1Y4, X2Y4, X3Y4, X4Y4$

First, the matrix moves along the X-axis adding recognized pixels between starting samples (pixels). Then, the matrix continues that process until all the pixels between starting samples on the X-axis are recognized. Each recognized pixel is recorded in the matrix and entered into an STB structure.

After that cycle is finished, the process starts again from the starting samples (pixels) on the Y-axis. When the first set of pixels on the Y-axis is recognized, the matrix moves again across the X-axis until all the pixels on the X-axis are recognized.

The whole procedure is repeated until all samples (pixels) are recognized on both axes.

It should be appreciated that application of the present invention to digital zoom technology can increase both the resolution of the digital camera's matrix as well as the digital zoom factor without loss of quality. For example, a digital camera with a 2 MPx matrix may be able to take pictures with the resolution of 20 MPx or 200 MPx or even higher.

As indicated earlier, the algorithm according to the present invention also has application with respect to motion detection and compression applications, among other applications. Below is an illustrative example of use of the inventive algorithm in connection with a motion detection and compression application with reference to FIG. 11.

Figure 11:
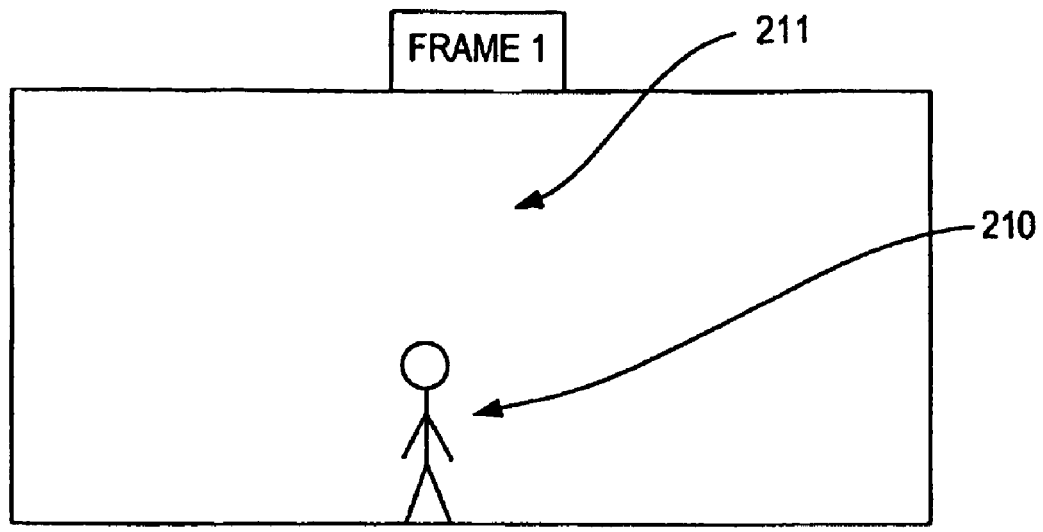
FIG. 11 illustrates a motion detection and compression application utilizing the inventive algorithm in accordance with an alternative embodiment of the present invention.
Figure 11:
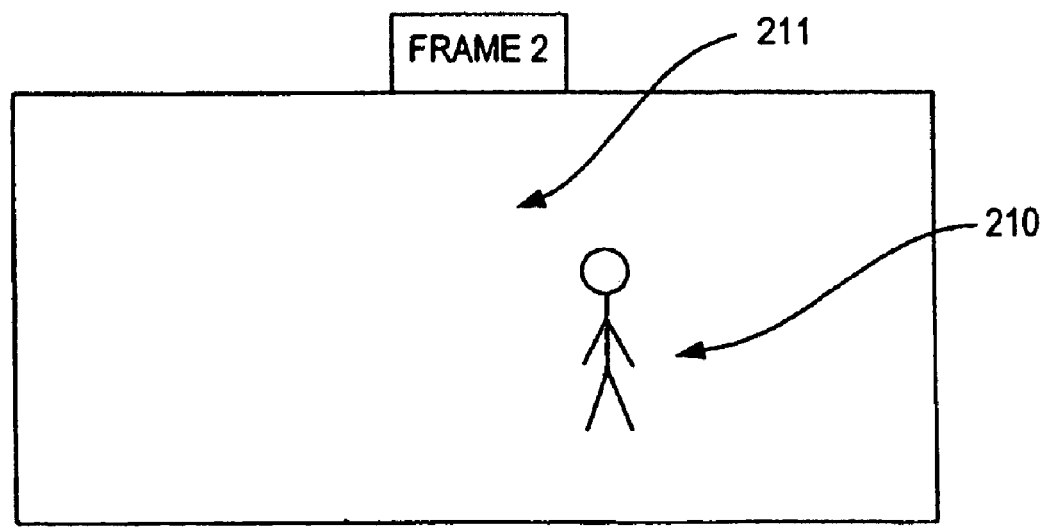

In FIG. 11, there is shown two frames (Frame 1 and Frame 2) taken with a video monitoring camera or like device. Frame 1 shows an object 210 and a background 211. Frame 2 shows the background and the object after the object has moved. Because of the movement of the object, the portion (fragment) of the background previously covered by the object (in Frame 1) becomes visible.

After the movement of object 210, the background 211 can be "rebuilt" and the moving object, which became visible as something other than the background, can be recognized (as a separate element which can be compressed). The movement is recorded as a separate entry into two STB structures—STB1 for the background 211, and STB2 for the found objects 210.

The background 211 is entered into the STB1 structure (the background is also treated as an object). Compression of the background 211 is similar to the compression of video discussed earlier.

The object 210 is entered into the STB2 structure. Compression of the object is similar to the compression of video discussed earlier.

Besides parameters and numbers of frame fragments of which objects are composed, each object entered into STB has a designated position on the X and Y axes in each frame in which it is present.

On static pictures there is no movement, but in each frame a different position of a given object is inscribed, which, in the end, gives the illusion of movement.

Accordingly, the present invention provides a new algorithm and method for accelerating the computational speed of a computer algorithm such as, for example, a cryptographic algorithm (e.g., an RSA algorithm), without affecting the underlying algorithm (i.e., without the need for altering the underlying code).

It should be appreciated that the aspects, features and advantages made apparent from the foregoing and the accompanying drawings are efficiently attained and, since certain changes may be made in the disclosed constructions and processes without departing from the spirit and scope of the invention, it is intended that all matter contained herein and in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method for accelerating the processing speed of a computer algorithm, comprising the steps of:

obtaining data to be processed by said computer algorithm;

providing a first data structure for holding at least a portion of said data;

setting an index representing a stabilization state of said first data structure to a value indicating an unstabilized state;

verifying said index setting;

obtaining at least one data element of said data; and when said index setting indicates an unstabilized state of said first data structure, (i) inserting at least a portion of said at least one data element into said first data structure, (ii) processing said portion of said at least one data element by said computer algorithm, (iii) inserting said processed portion of said at least one data element into said first data structure, (iv) determining whether said first data structure is filled, and (a) when said first data structure is filled, setting said index to a value representing a stabilized state of said first data structure, determining if all of said data have been processed, when all of said data have been processed, adding said processed portion of said at least one data element into a second data structure and ceasing further operation, when all of said data have not been processed, adding said processed portion of said at least one data element into said second data structure and revisiting said step of obtaining at least one data element of said data, and (b) when said first data structure is not filled, determining if all of said data have been processed, when all of said data have been processed, adding said processed portion of said at least one data element into said second data structure and ceasing further operation, when all of said data have not been processed, adding said processed portion of said at least one data element into said second data structure and revisiting said step of obtaining at least one data element of said data; and when said index setting indicates a stabilized state of said first data structure, (1) searching said first data structure for at least a portion of said at least one data element that has been processed by said computer algorithm, (2) copying said processed portion of said at least one data element from said first data structure into said second data structure, (3) determining if all of said data have been processed, and (A) when all of said data have been processed, ceasing further operation, and (B) when all of said data have not been processed, revisiting said step of obtaining at least one data element of said data.

2. The method according to claim 1, wherein ones of said processed portion of said at least one data element are placed in said second data structure only after said first data structure is in a stabilized state.

3. The method according to claim 1, further comprising the steps of verifying said stabilization state of said first data structure when said index setting indicates an unstabilized state of said first data structure.

4. The method according to claim 1, wherein said computer algorithm is an encryption algorithm, and said step of processing said portion of said at least one data element by said computer algorithm includes encrypting said portion of said at least one data element.

5. The method according to claim 4, wherein said computer algorithm is an RSA encryption algorithm.

6. The method according to claim 1, wherein said computer algorithm is a decryption algorithm, and said step of processing said portion of said at least one data element by said computer algorithm includes decrypting said portion of said at least one data element.

7. The method according to claim 6, wherein said computer algorithm is an RSA decryption algorithm.

8. A computer program product comprising a computer usable medium having a computer readable program code means embodied in said medium for causing an application program to execute on a computer for accelerating the processing speed of a computer algorithm, comprising:

means for obtaining data to be processed by said computer algorithm;

a first data structure for holding at least a portion of said data;

means for setting an index representing a stabilization state of said first data structure to a value indicating an unstabilized state;

means for verifying said index setting;

means for obtaining at least one data element of said data; and means for, when said index setting indicates an unstabilized state of said first data structure, (i) inserting at least a portion of said at least one data element into said first data structure, (ii) processing said portion of said at least one data element by said computer algorithm, (iii) inserting said processed portion of said at least one data element into said first data structure, (iv) determining whether said first data structure is filled, and (a) when said first data structure is filled, setting said index to a value representing a stabilized state of said first data structure, determining if all of said data have been processed, when all of said data have been processed, adding said processed portion of said at least one data element into a second data structure and ceasing further operation, when all of said data have not been processed, adding said processed portion of said at least one data element into said second data structure and revisiting said step of obtaining at least one data element of said data, and (b) when said first data structure is not filled, determining if all of said data have been processed, when all of said data have been processed, adding said processed portion of said at least one data element into said second data structure and ceasing further operation, when all of said data have not been processed, adding said processed portion of said at least one data element into said second data structure and revisiting said step of obtaining at least one data element of said data; and means for, when said index setting indicates a stabilized state of said first data structure, (1) searching said first data structure for at least a portion of said at least one data element that has been processed by said computer algorithm, (2) copying said processed portion of said at least one data element from said first data structure into said second data structure, (3) determining if all of said data have been processed, and (A) when all of said data have been processed, ceasing further operation, and (B) when all of said data have not been processed, revisiting said step of obtaining at least one data element of said data.

9. A system for accelerating the processing speed of a computer algorithm, comprising:

means for obtaining data to be processed by said computer algorithm;

a first data structure for holding at least a portion of said data;

means for setting an index representing a stabilization state of said first data structure to a value indicating an unstabilized state;

means for verifying said index setting;

means for obtaining at least one data element of said data; and means for, when said index setting indicates an unstabilized state of said first data structure, (i) inserting at least a portion of said at least one data element into said first data structure, (ii) processing said portion of said at least one data element by said computer algorithm, (iii) inserting said processed portion of said at least one data element into said first data structure, (iv) determining whether said first data structure is filled, and (a) when said first data structure is filled, setting said index to a value representing a stabilized state of said first data structure, determining if all of said data have been processed, when all of said data have been processed, adding said processed portion of said at least one data element into a second data structure and ceasing further operation, when all of said data have not been processed, adding said processed portion of said at least one data element into said second data structure and revisiting said step of obtaining at least one data element of said data, and (b) when said first data structure is not filled, determining if all of said data have been processed, when all of said data have been processed, adding said processed portion of said at least one data element into said second data structure and ceasing further operation, when all of said data have not been processed, adding said processed portion of said at least one data element into said second data structure and revisiting said step of obtaining at least one data element of said data; and means for, when said index setting indicates a stabilized state of said first data structure, (1) searching said first data structure for at least a portion of said at least one data element that has been processed by said computer algorithm, (2) copying said processed portion of said at least one data element from said first data structure into said second data structure, (3) determining if all of said data have been processed, and (A) when all of said data have been processed, ceasing further operation, and (B) when all of said data have not been processed, revisiting said step of obtaining at least one data element of said data.

* * * * *